US009440262B2

(12) United States Patent
Geertsen

(10) Patent No.: US 9,440,262 B2
(45) Date of Patent: Sep. 13, 2016

(54) APPARATUS AND METHOD FOR SILICON POWDER MANAGEMENT

(71) Applicant: REC Silicon Inc, Moses Lake, WA (US)

(72) Inventor: Robert J. Geertsen, Pasco, WA (US)

(73) Assignee: REC Silicon Inc, Moses Lake, WA (US)

( * ) Notice: Subject to any disclaimer, the term of this patent is extended or adjusted under 35 U.S.C. 154(b) by 25 days.

(21) Appl. No.: 14/536,496

(22) Filed: Nov. 7, 2014

(65) Prior Publication Data

US 2016/0129478 A1 May 12, 2016

(51) Int. Cl.
*B07B 4/06* (2006.01)

(52) U.S. Cl.
CPC .................................... *B07B 4/06* (2013.01)

(58) Field of Classification Search
CPC ........... B07B 7/00; B07B 7/08; B07B 7/083; B07B 7/086; B07B 9/02
See application file for complete search history.

(56) References Cited

U.S. PATENT DOCUMENTS

| | | | | | |
|---|---|---|---|---|---|
| 2,389,715 | A | * | 11/1945 | Beardsley ................ | B68G 3/10 19/200 |
| 2,523,259 | A | * | 9/1950 | Aber ......................... | B07B 1/24 209/284 |
| 3,804,249 | A | | 4/1974 | Gibbons et al. | |
| 3,834,530 | A | | 9/1974 | Bell | |
| 3,957,629 | A | | 5/1976 | Paterson | |
| 3,957,630 | A | | 5/1976 | Mooradian | |
| 3,970,547 | A | | 7/1976 | Theodore et al. | |
| 4,029,572 | A | | 6/1977 | Theodore et al. | |
| 4,039,434 | A | | 8/1977 | Croucher | |
| 4,043,901 | A | | 8/1977 | Gauld | |
| 4,070,202 | A | | 1/1978 | Nollet | |
| 4,107,034 | A | | 8/1978 | Paterson et al. | |
| 4,178,232 | A | | 12/1979 | Nollet | |
| 4,194,633 | A | | 3/1980 | Paterson et al. | |
| 4,210,527 | A | | 7/1980 | Paterson et al. | |
| 4,278,532 | A | | 7/1981 | Birch et al. | |
| 4,479,286 | A | * | 10/1984 | Brown ..................... | D01G 9/10 19/107 |
| 4,549,660 | A | | 10/1985 | Werling | |
| 4,634,060 | A | | 1/1987 | Riemann et al. | |
| 4,689,143 | A | * | 8/1987 | Miers ........................ | B07B 1/22 19/200 |
| 4,784,840 | A | | 11/1988 | Gautreaux et al. | |
| 4,883,687 | A | | 11/1989 | Gautreaux et al. | |
| 4,998,675 | A | | 3/1991 | Mohrman | |

(Continued)

FOREIGN PATENT DOCUMENTS

| | | |
|---|---|---|
| EP | 1818111 A2 | 8/2007 |
| WO | WO 2006/007082 | 1/2006 |
| WO | WO 2006/062660 | 6/2006 |

OTHER PUBLICATIONS

International Search Report and Written Opinion issued by Korean Intellectual Property Office on Jul. 27, 2015, for PCT/US2014/070599, 7pp.

*Primary Examiner* — Joseph C Rodriguez
(74) *Attorney, Agent, or Firm* — Klarquist Sparkman, LLP

(57) ABSTRACT

Methods and apparatus for separating polysilicon powder from a mixture of granular polysilicon and polysilicon powder are disclosed. The method includes tumbling the polysilicon material in a tumbling device. The tumbling device includes a tumbler drum having one or more lifting vanes spaced apart from one another and extending longitudinally along an interior surface of the tumbler drum. The lifting vanes facilitate separation of polysilicon powder and granules as the tumbler drum is rotated about its longitudinal axis of rotation.

18 Claims, 12 Drawing Sheets

(56) References Cited

U.S. PATENT DOCUMENTS 5,022,982 A 6/1991 Greeley
5,056,924 A 10/1991 Christenson
5,158,182 A * 10/1992 Fischer-Helwig ...... B07B 7/083 209/135
5,178,457 A 1/1993 Helmy
5,195,640 A 3/1993 Seaverns
5,205,847 A * 4/1993 Montieth ............... B01D 46/26 55/294
5,242,671 A 9/1993 Allen et al.
5,405,658 A 4/1995 Ibrahim et al.
5,593,042 A * 1/1997 Keller ....................... B07B 1/20 209/261
5,613,279 A * 3/1997 Rhyne ...................... D01G 9/08 19/200
5,762,689 A * 6/1998 Hunziker ........... B01D 46/0056 55/283
5,791,493 A 8/1998 Meyer
5,855,232 A 1/1999 Oda et al.
6,110,242 A * 8/2000 Young .................... B01D 45/12 209/139.2
7,291,222 B2 11/2007 Holder et al.
7,708,828 B2 5/2010 Weidhaus et al.
8,075,692 B2 12/2011 Osborne et al.
8,800,777 B2 * 8/2014 Schneider ................. B07B 4/02 209/138
2003/0077128 A1 4/2003 Williams et al.
2004/0079234 A1 4/2004 Gorbulsky
2004/0151652 A1 8/2004 Herold et al.
2005/0279277 A1 12/2005 Holder et al.
2006/0105105 A1 5/2006 Ibrahim et al.
2008/0187481 A1 8/2008 Ibrahim et al.
2012/0052297 A1 3/2012 Pech et al.
2013/0236367 A1 * 9/2013 Bhusarapu .............. C01B 33/03 422/144
2013/0295385 A1 11/2013 Hertlein et al.
2013/0309524 A1 11/2013 Vietz et al.
2014/0262981 A1 9/2014 Yun et al.

* cited by examiner

APPARATUS AND METHOD FOR SILICON POWDER MANAGEMENT

FIELD

This disclosure concerns embodiments of an apparatus and method for separating polysilicon granules and powder.

BACKGROUND

As produced, e.g., by a fluid bed reactor, such as the reactor shown in U.S. Pat. No. 8,075,692, granular polysilicon typically contains from 0.25% to 3% powder or dust by weight. The powder may render the product unsuitable for certain applications. For example, a product containing such levels of powder is unsuitable for monocrystalline applications since the powder can cause a loss of structure, making single crystal growth impossible.

Wet processes for removing dust (e.g., rinsing, ultrasonic cleaning, etching) have disadvantages because there is complex, costly equipment to maintain, water and/or chemicals are required, and the processing may cause detrimental oxidation of the polysilicon. Thus, there is a demand for a dry process that produces granular polysilicon with reduced powder levels.

SUMMARY

Embodiments of a tumbling device for separating granular polysilicon and polysilicon powder include a tumbler drum comprising a first end wall, a second end wall, and a side wall that extends between the end walls and together with the end walls defines a chamber, the side wall being configured to produce a primary transverse particle flow and a secondary transverse particle flow by rotation of the tumbler drum, wherein the side wall, the first end wall, the second end wall, or a combination thereof define a gas inlet and an outlet, with the gas inlet and the outlet being at spaced apart locations. The tumbling device further includes a source of sweep gas fluidly connected to the gas inlet, a dust collection assembly fluidly connected to the outlet, and a source of motive power operable to rotate the tumbler drum about an axis of rotation that extends longitudinally through the chamber. In some embodiments, a port extends through the side wall, the port being configured to provide access to the chamber for introducing the polysilicon material into the chamber and for removing the tumbled polysilicon material from the chamber.

In any of the embodiments, the gas inlet may extend through the first end wall, the outlet may extend through the second end wall, and the tumbling device may further include an exhaust duct positioned between the dust collection assembly and the outlet, the exhaust duct being in fluid communication with the dust collection assembly and the outlet, and one or more helical vanes located within the exhaust duct. In some embodiments, an outer surface of the helical vane comprises polyurethane.

In any of the embodiments, the side wall of the tumbling device may have a generally cylindrical interior surface, and the tumbler drum may further comprise one or more lifting vanes attached to the side wall, spaced apart from one another and extending longitudinally along the interior surface of the side wall. In some embodiments, the tumbling device includes from one to forty lifting vanes. In any of the embodiments, each lifting vane independently may have a height from 0.01× to 0.3× of an inner diameter of the chamber, a leading edge with respect to the direction of rotation about the axis of rotation, and a leading edge pitch angle θ ranging from 15 to 90 degrees relative to a plane B parallel to an upper surface of the lifting vane and tangential to the interior surface of the side wall. In any of the embodiments, each lifting vane may have an outer surface that comprises quartz, silicon carbide, silicon nitride, silicon, or a combination thereof, or have an outer surface that comprises polyurethane.

In any or all of the foregoing embodiments including one or more lifting vanes, the tumbling device may further include an intermediate support positioned between adjacent lifting vanes, wherein the intermediate support extends longitudinally along the interior surface of the side wall. In some embodiments, the intermediate support has an outer surface that comprises polyurethane.

In any of the embodiments, the side wall of the tumbler drum, the first end wall, the second end wall, or a combination thereof may comprise quartz, silicon carbide, silicon nitride, or silicon, or has an interior surface that comprises polyurethane.

Embodiments of a method for separating polysilicon powder from a mixture of granular polysilicon and polysilicon powder include (i) introducing a polysilicon material that is a mixture of granular polysilicon and polysilicon powder into a tumbling device as disclosed herein; (ii) rotating the tumbler drum of the tumbling device about the axis of rotation at a rotational speed for a period of time; (iii) flowing sweep gas from the gas source through the chamber of the tumbler drum from the gas inlet to the outlet while the tumbling device is rotating, thereby entraining separated polysilicon powder in the sweep gas; (iv) passing sweep gas and entrained polysilicon powder through the outlet, whereby at least a portion of the polysilicon powder is separated from the granular polysilicon; and (v) removing tumbled polysilicon material from the tumbling device, wherein the tumbled polysilicon material comprises a reduced percentage by weight of polysilicon powder than the introduced polysilicon material. In some embodiments, method further includes collecting the entrained separated polysilicon powder at a location external to the tumbling device.

In any of the embodiments, the rotational speed may be 55-90% of the critical speed of the tumbler drum, the critical speed being the rotational speed at which centrifugal forces within the tumbler drum equal or exceed gravitational forces. In any of the embodiments, the period of time may be at least one hour.

In any of the embodiments, the method may include rotating the tumbling device about the axis of rotation at a first rotational speed for a first period of time, and subsequently rotating the tumbling device about the axis of rotation at a second rotational speed for a second period of time, wherein the second rotational speed is greater than the first rotational speed. In some embodiments, the first rotational speed is 55-75% of the critical speed of the tumbler drum, the critical speed being the rotational speed at which centrifugal forces within the tumbler drum equal or exceed gravitational forces, and the second rotational speed is 65-90% of the critical speed.

In any of the embodiments, the method may further include annealing the polysilicon material before introducing the polysilicon material into the tumbling device, or annealing the tumbled polysilicon material after removing the tumbled polysilicon material from the tumbling device.

In any of the embodiments, the method may further include (vi) subsequently flowing the tumbled polysilicon material through a zigzag classifier to remove additional polysilicon powder from the tumbled polysilicon material, wherein the zigzag classifier comprises a baffle tube having a zigzag configuration and including an upper opening, a lower opening for discharging polysilicon material, and a port positioned between the upper opening and lower opening, the port being configured to receive the tumbled polysilicon material and deliver the tumbled polysilicon material into the baffle tube; (vii) providing an upward flow of gas through the baffle tube, thereby entraining and removing at least a portion of the polysilicon powder from the tumbled polysilicon material as the tumbled polysilicon material traverses the baffle tube from the intermediate port to the lower opening; and (viii) collecting discharged polysilicon material from the lower opening, wherein the discharged polysilicon material comprises a reduced percentage by weight of polysilicon powder than the tumbled polysilicon material.

In any of the embodiments, the method may further include forming the introduced polysilicon material by (a) flowing an initial mixture of granular polysilicon and polysilicon powder through a zigzag classifier, thereby removing a portion of the polysilicon powder from the initial mixture to form the mixture of granular polysilicon and polysilicon powder, wherein the zigzag classifier comprises a baffle tube having a zigzag configuration and including an upper opening, a lower opening for discharging polysilicon material, and a port positioned between the upper opening and lower opening, the port being configured to receive the initial mixture and deliver the initial mixture into the baffle tube; (b) providing an upward flow of gas through the baffle tube, thereby entraining and removing at least a portion of the polysilicon powder from the initial mixture as the initial mixture traverses the baffle tube from the intermediate port to the lower opening; and (c) collecting polysilicon material that is discharged from the lower opening, wherein the collected polysilicon material comprises a reduced percentage by weight of polysilicon powder than the initial mixture.

The foregoing and other features and advantages of the invention will become more apparent from the following detailed description, which proceeds with reference to the accompanying figures.

DETAILED DESCRIPTION

Figure 1B:
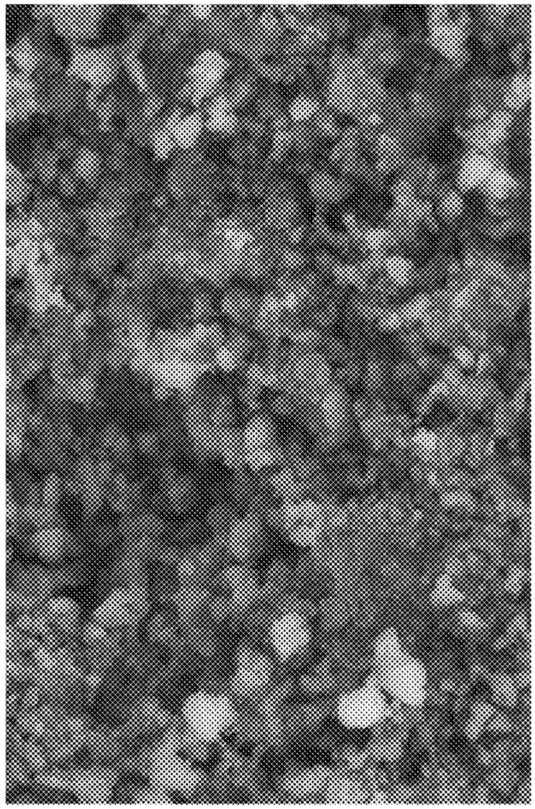
FIGS. 1A and 1B are micrographs of granular silicon produced in a fluid bed reactor. The images were obtained with a scanning electron microscope at 10,000× magnification.
Figure 1A:
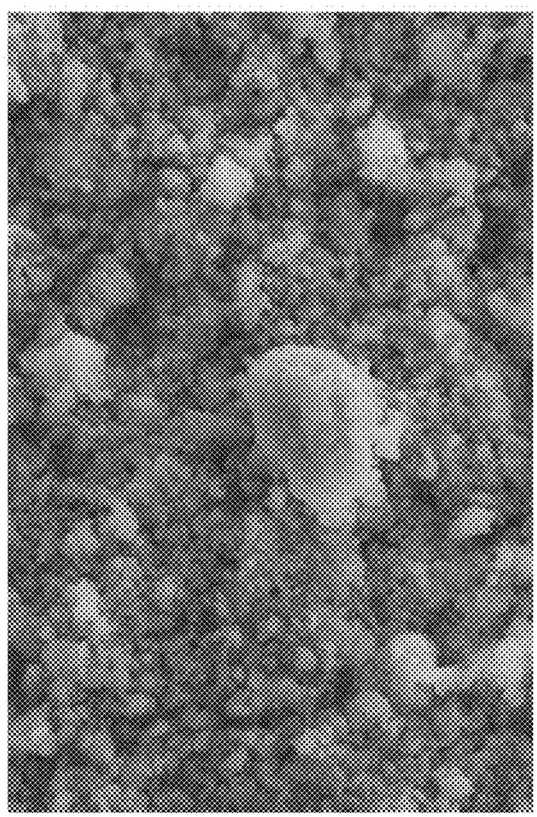

Granular polysilicon is produced in a fluid bed reactor (FBR) by silane pyrolysis. The conversion of silane to silicon occurs via homogeneous and heterogeneous reactions. The homogeneous reaction produces nano- to micron-sized silicon powder or dust, which will remain in the bed as free powder, attach to silicon granules, or elutriate and leave the FBR with effluent hydrogen gas. The heterogeneous reaction forms a solid silicon deposit on available surfaces, which primarily are surfaces of granular and seed material (silicon particles onto which additional silicon is deposited, typically having a diameter in the largest dimension of 0.1-0.8 mm, such as 0.2-0.7 mm or 0.2-0.4 mm). This process encapsulates some of the powder and results in growth rings on the granules with some variation in density. On a microscopic scale, the surface of granular silicon has porosity that can trap dust. The surface also has microscopic attached features that can be broken away or otherwise removed when the granules are handled through a process known as attrition. FIGS. 1A and 1B are SEM images with 10,000× magnification of as-produced FBR granular silicon which reveal both dust and microscopic surface features.

In the context of this disclosure, the terms "powder" and "dust" are used interchangeably, and refer to polycrystalline silicon particles having an average diameter less than 250 μm. As used herein, "average diameter" means the mathematical average diameter of a plurality of powder or dust particles. When polysilicon is produced in a fluidized bed reactor, the average diameter of the powder particles may be considerably smaller than 250 μm, such as an average diameter less than 50 μm. Individual powder particles may have a diameter ranging from 40 nm to 250 μm, and more typically have a diameter ranging from 40 nm to 50 μm, or from 40 nm to 10 μm. Particle diameter can be determined by several methods, including laser diffraction (particles of submicron to millimeter diameter), dynamic image analysis (particles of 30 μm to 30 nm diameter), and/or mechanical screening (particles of 30 μm to more than 30 mm diameter).

The terms "granular polysilicon" and "granules" refer to polysilicon particles having an average diameter of 0.25 to 20 mm, such as an average diameter of 0.25-10, 0.25-5, or 0.25 to 3.5 mm. As used herein, "average diameter" means the mathematical average diameter of a plurality of granules. Individual granules may have a diameter ranging from 0.1-30 mm.

As produced, e.g., by a fluid bed reactor, granular polysilicon typically contains from 0.25% to 3% powder or dust by weight; this quantity includes both free and surface-attached dust. The quantity of powder present in granular polysilicon is undesirable for users who melt and recrystallize the silicon with the potential to cause loss of structure for single-crystal growth processes. The powder also creates housekeeping and industrial hygiene difficulties, and potentially a combustible dust hazard for the users. Apparatus and methods for reducing the amount of both free and surface-attached powder in a mixture of granular polysilicon and polysilicon powder are disclosed. The apparatus and method also advantageously polish the surfaces of the granular silicon to reduce the amount of attrition-produced dust that would form during subsequent handling and shipping to end users.

I. TUMBLING DEVICE

Figure 2:
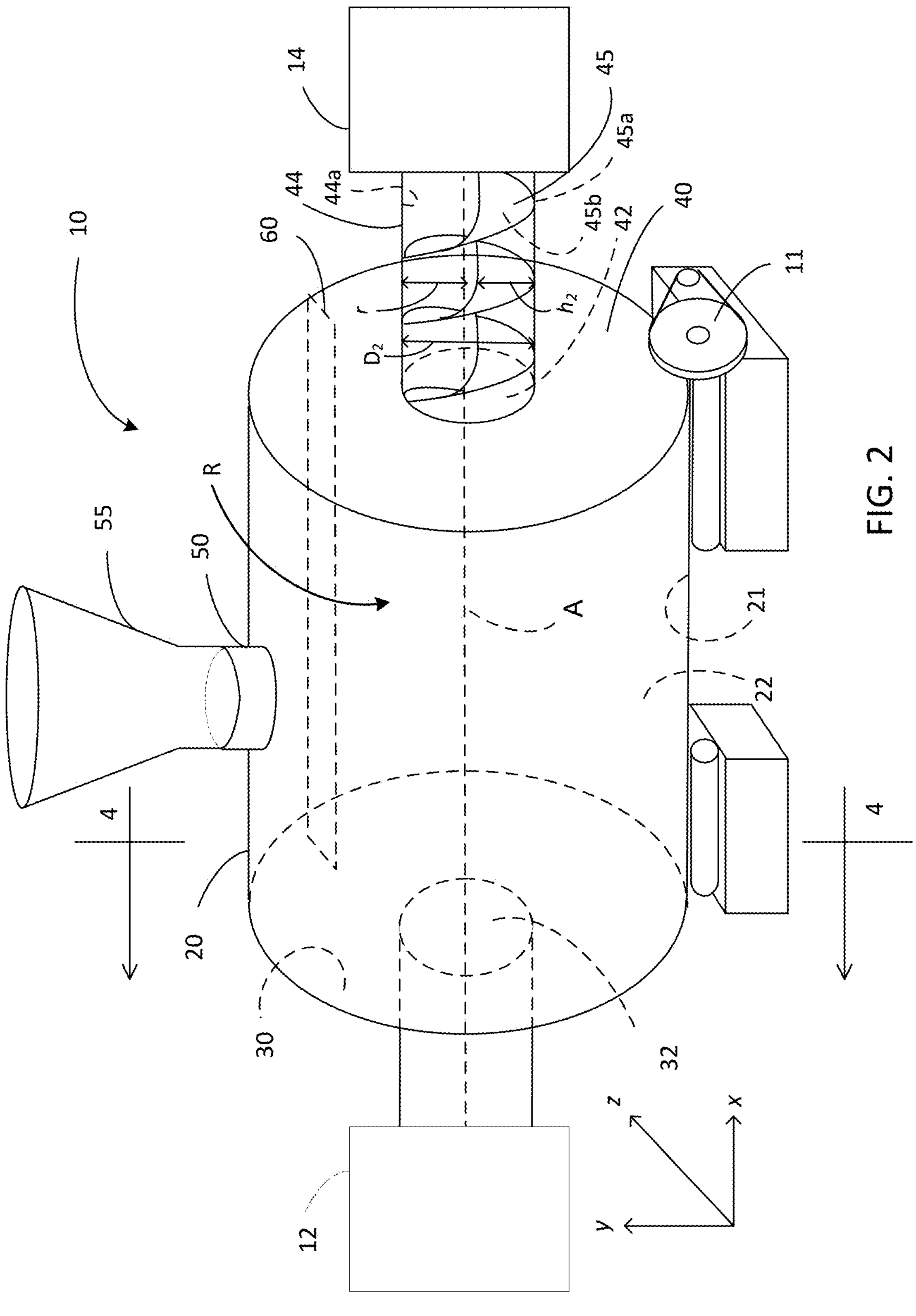
FIG. 2 is an oblique schematic drawing of one embodiment of a tumbler drum.

An apparatus for separating granular polysilicon and polysilicon powder includes a tumbling device, also known as an autogenous grinding mill, that comprises a tumbler drum and apparatus for rotating the tumbler drum, e.g., a motor. FIG. 2 depicts a tumbler drum 10 and a source of motive power 11 operable to rotate the tumbler drum. The tumbler drum 10 has a longitudinal axis of rotation A, a side wall 20, a first end wall 30 defining a gas inlet 32, and a second end wall 40 defining an outlet 42.

Figure 3B:
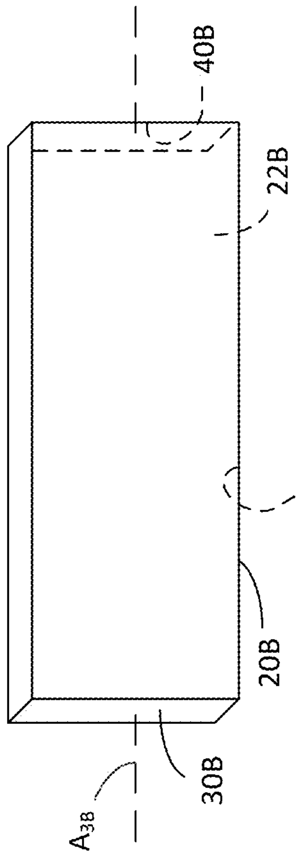
FIG. 3B is an oblique schematic drawing of one embodiment of a tumbler drum having a rectangular cross-section.
Figure 3A:
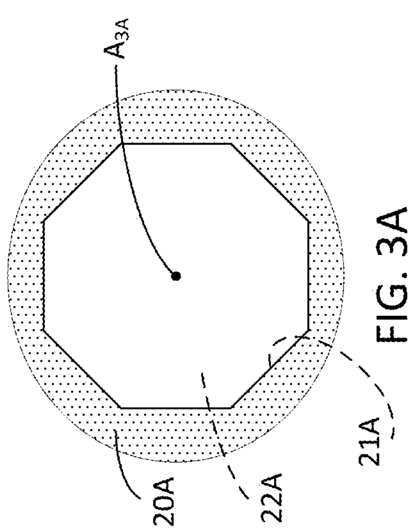
FIG. 3A is a cross-sectional view of a tumbler drum chamber having an inner surface that is polygonal in cross-section.
Figure 3C:
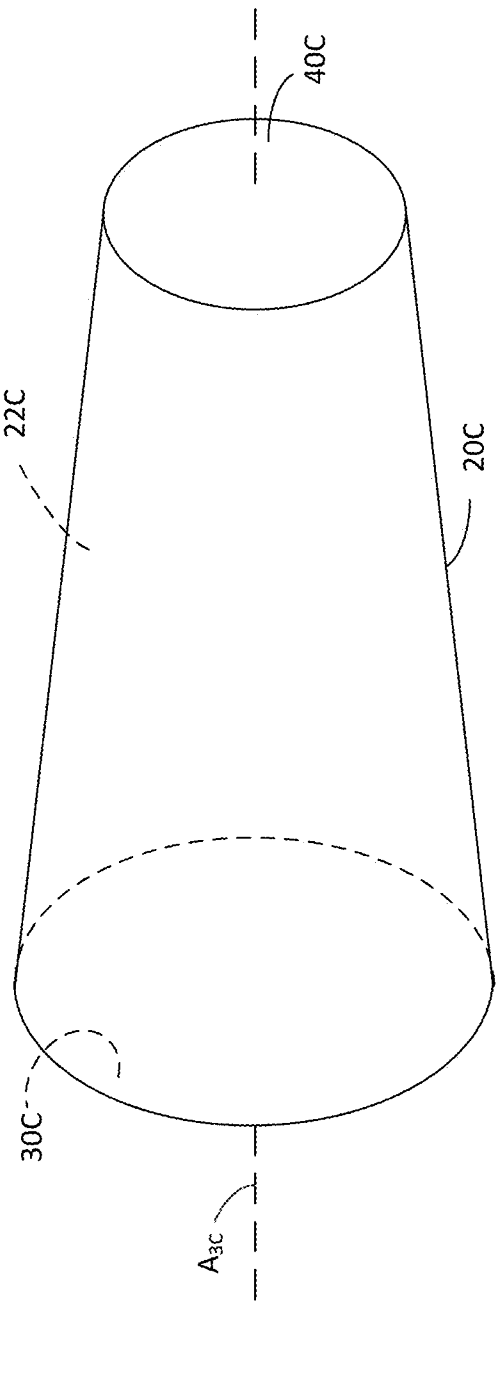
FIG. 3C is an oblique schematic drawing of one embodiment of a tumbler drum having a chamber defined by a frustoconical wall.

The side wall 20 of the exemplary tumbler drum 10 illustrated in FIG. 2 is tubular and together with end walls 30, 40 defines a chamber 22. The illustrated side wall 20 is a cylinder with a substantially constant transverse cross-sectional geometry along longitudinal axis of rotation A. Other geometries are also contemplated. For example, side wall 20 could have an inner surface that defines a chamber having a boundary that is triangular, square, pentagonal, hexagonal, or higher order polygonal in cross-section. In some embodiments, side wall 20A may include an internal surface 21A including from 3-20 facets or planar segments forming a chamber 22A having a polygonal boundary in cross-section and an axis of rotation $A_{3A}$ (FIG. 3A). The side wall 20B, first end wall 30B, and second end wall 40B collectively could be a square box or other rectangular box having an axis of rotation $A_{3B}$ (FIG. 3B). Side wall 20C could have a frustoconical inner surface defining a chamber 22C with the inner surface having a cross-sectional dimension that is greater at one of the first end wall 30C or the second end wall 40C than at the other, and having an axis of rotation $A_{3C}$ (FIG. 3C). In any of the embodiments, the longitudinal axis of rotation A may be centered within the chamber 22 as shown in FIG. 2, or the axis of rotation A may be off-center. In one embodiment, the side wall 20, first end wall 30, and second end wall 40 collectively may define a v-mixer (i.e., a mixing device having a tumbler drum that defines a mixing chamber generally in the shape of the letter "V" and that is rotatable about a horizontal axis of rotation).

The exemplary tumbler drum 10 illustrated in FIG. 2 further includes a port 50 extending through the side wall 20. Port 50 may be used to introduce a polysilicon material that is a mixture of granular polysilicon and polysilicon powder into the chamber 22. Port 50 also may be used to remove tumbled polysilicon material from the chamber 22. Port 50 is closed during rotation of the tumbler drum 10. A feed hopper 55 may be removably or fixedly connected to port 50 to facilitate introduction of the polysilicon material into the chamber 22 and/or to facilitate removal of granular polysilicon from the chamber 22 after tumbling. Alternatively, the feed hopper may be integral with the side wall, i.e., the side wall and hopper are a unitary structure wherein the port extends through the side wall and into the hopper.

A source of sweep gas 12 is connected to gas inlet 32 to provide a sweep gas flow longitudinally through the chamber 22. A filter (not shown), e.g., a HEPA filter, may be positioned between the sweep gas source 12 and gas inlet 32. A dust collection assembly 14, including a blower, a cyclone and a filter assembly, is operably connected to outlet 42 to collect dust removed from the granular polysilicon. In one embodiment (not shown), sweep gas is recirculated from the dust collection assembly to the gas inlet 32.

In one embodiment, longitudinal axis A is horizontal. In another embodiment, longitudinal axis A is tilted such that outlet 42 is lower than inlet 32. Longitudinal axis A may be tilted at an angle of up to 30 degrees from horizontal.

Figure 4:
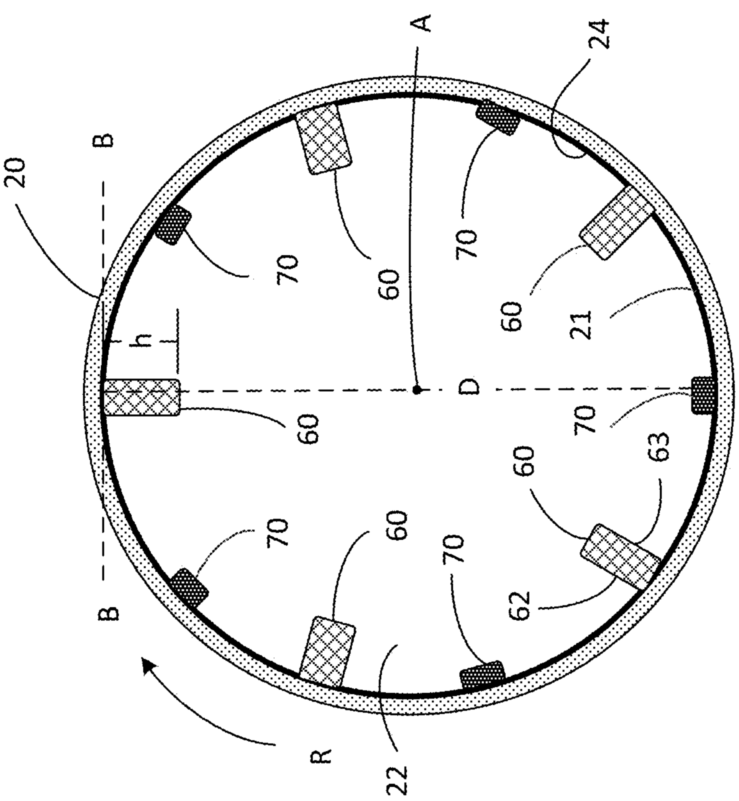
FIG. 4 is a cross-sectional view taken along line 4-4 of FIG. 2.

FIG. 4 is a cross-section in the yz-plane of the tumbler drum 10. The arrow R indicates the direction of rotation. In the exemplary embodiment illustrated in FIG. 4, one or more lifting vanes 60 are attached to and extend inward from side wall 20. Lifting vane 60 extends longitudinally along an interior surface 21 of side wall 20, advantageously generally parallel to axis A. In some embodiments, the lifting vane 60 extends from the end wall 30 to the end wall 40. In another embodiment, each lifting vane comprises a plurality of spaced lifting vane sections or segments extending longitudinally along the interior surface 21 of side wall 20. Each lifting vane or lifting vane segment has a leading edge 62 and a trailing edge 63 with respect to the direction of rotation of the tumbler drum about the longitudinal axis A. Lifting vanes 60 are constructed of, or coated with, a non-contaminating material. Suitable non-contaminating materials include silicon, silicon carbide, silicon nitride, quartz. In one embodiment, lifting vanes 60 are coated with polyurethane.

When the interior surface 21B of side wall 20B, has a multi-sided cross-sectional geometry, particularly a lower-order cross-sectional geometry (e.g., a triangle or rectangle) as shown in the embodiment of FIG. 3B, the tumbler drum might not include lifting vanes. In such geometries, interior facets of side wall 20B act as lifting vanes when the tumbler drum is rotated.

Figure 5:
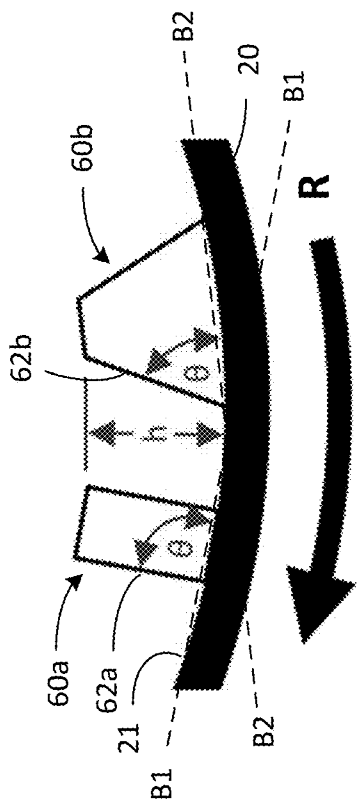
FIG. 5 is an enlarged cross-sectional partial view taken along line 4-4 of FIG. 2 illustrating two exemplary lifting vane geometries.
Figure 6:
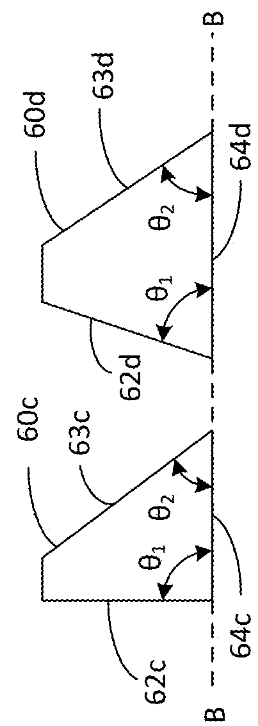
FIG. 6 is a partial schematic cross-sectional drawing of a tumbler drum, which drawing illustrates two additional exemplary lifting vane geometries.

FIG. 5 illustrates two exemplary lifting vane geometries, lifting vane 60*a* and lifting vane 60*b*. Lifting vane 60*a* has a substantially rectangular geometry, and lifting vane 60*b* has a substantially trapezoidal geometry as viewed parallel to the axis A. Lifting vanes 60*a*, 60*b* have a height h and a leading edge pitch angle θ relative to planes B1, B2, respectively, that are tangential to the interior surface 21 of side wall 20 at the midpoints of the lifting vanes are viewed parallel to the axis A. The leading edge pitch angle θ of each lifting vane 60 independently may be from 15 to 90 degrees, such as from 30 to 90 degrees, 45 to 90 degrees, from 60 to 90 degrees, from 30 to 80 degrees, or from 45-80 degrees. In FIG. 5, exemplary lifting vane 60*a* has a leading edge pitch angle θ of 90 degrees relative to tangential plane B1, and exemplary lifting vane 60*b* has a leading edge pitch angle θ of 60 degrees relative to tangential plane B2. It is understood that a trapezoidal lifting vane 60 may be asymmetric, i.e., the lifting vane may have a leading surface 62, and a trailing surface 63 that have different pitch angles relative to plane B as shown in FIG. 6. FIG. 6 shows two exemplary vane configurations 60*c*, 60*d*, in which the leading surface 62*c*, 62*d*, and trailing surface 63*c*, 63*d* of each lifting vane 60*c*, 60*d*, respectively, have two different pitch angles θ1, θ2, relative to the tangential plane B. In some embodiments, the leading surface 62 and trailing surface 63 of the lifting vane 60 are substantially planar; in other words, the lifting vane 60 does not have a bucket or scoop configuration. The lifting vane 60 does not have a helical configuration, and there is no augur, feed screw, or helical vane positioned within the chamber 22.

In some embodiments, tumbler drum 10 includes at least one lifting vane 60, such as from 1-40, 1-20, 5-15, or 10-12 lifting vanes 60. The number of vanes may depend, at least in part, on the inner circumference of the side wall 20 and/or the height of the lifting vanes. As the inner circumference of the side wall 20 increases, the number of lifting vanes may increase. The number of lifting vanes may vary inversely with the height of the lifting vanes, i.e., as the vane height increases, the number of vanes may decrease. The number of lifting vanes may also be determined by the vane geometry (e.g., the width of the lifting vane base 64*c*, 64*d* and pitch angles θ1, θ2) and the particle size of the granular polysilicon. For example, it is advantageous to space the lifting vanes no closer together than the maximum particle size of the granular polysilicon. The number of vanes, vane height, and vane geometry are selected in conjunction with the rotation speed to establish a secondary transverse flow advantageous for optimum surface polishing of and dust removal from the granular polysilicon within the chamber 22.

In embodiments comprising a plurality of lifting vanes 60, the lifting vanes 60 are spaced apart from one another as shown in FIG. 4. The lifting vanes 60 may be spaced substantially equidistant from one another around the inner circumference of side wall 20. Each lifting vane 60 independently has a height h, measured radially relative to the tangential plane B, ranging from 0.01× to 0.3× the inner diameter D of the chamber 22, such as from 0.05× to 0.3× or from 0.07× to 0.2× the inner diameter D of the chamber. In some arrangements, as the height of the lifting vanes decreases, an increased number of lifting vanes may be utilized. In one example, a tumbling device 10 has a right cylindrical side wall inner surface 21 with an inner diameter of 6 feet (183 cm) and comprises twelve lifting vanes 60 within the chamber 22; eight of the lifting vanes having a height h of 6 inches (15.2 cm), and four of the lifting vanes having a height of 10 inches (25.4 cm).

In some arrangements, one or more intermediate supports 70 are spaced around the inner circumference of side wall 20. Intermediate supports 70 extend longitudinally along the interior surface of side wall 20, advantageously generally in parallel to axis A. Intermediate supports 70 may be positioned between adjacent lifting vanes 60. Advantageously, the intermediate supports 70 are spaced substantially equidistant from one another around the inner circumference of side wall 20. When a single intermediate support is positioned between an adjacent pair of lifting vanes 60, the intermediate support may be located at a midpoint between the lifting vanes. Intermediate supports 70 provide side wall 20 with additional strength and may reduce deformation of the side wall. Intermediate supports 70 have a height less than the height of the lifting vanes 60, e.g., a height less than 0.05× the inner diameter of the chamber 22.

A polysilicon material that is a mixture of granular polysilicon and polysilicon powder is introduced into the chamber 22 of the tumbler drum 10 through the port 50. Rotation around the longitudinal axis A is initiated. The tumbler drum 10 is rotated at any suitable speed, such as a speed from 1-100 rpm, 2-75 rpm, 5-50 rpm, 10-40 rpm or 20-30 rpm. The speed is selected to effectively separate at least some of the powder from the polysilicon granules as portions of the mixture are lifted—e.g., by lifting vanes 60—and fall as the tumbler drum 20 rotates. A person of ordinary skill in the art understands that the selected speed may depend at least in part on the size of the tumbler drum and/or the mass of the mixture within the tumbler.

A flow of sweep gas is introduced into the chamber 22 via the gas inlet 32. The sweep gas may be air or an inert gas (e.g., argon, nitrogen, helium). As the tumbler drum 10 rotates, loose polysilicon powder becomes airborne and forms a cloud within the chamber 22. The sweep gas flow rate is sufficiently high to entrain the loose polysilicon powder and carry it out of the chamber 22 via outlet 42; however, the sweep gas flow rate is not sufficient to entrain polysilicon granules. Advantageously, when the sweep gas is air, a sufficient gas flow rate maintained to keep the airborne dust concentration within the chamber 22 less than the minimum explosible concentration (MEC). A lower sweep rate can be used when the sweep gas is inert (e.g., nitrogen, argon, helium). Suitable sweep gas axial flow velocities may range from 20 cm/sec to 40 cm/sec (0.7 ft/sec to 1.3 ft/sec) in the chamber 22 and from 200 cm/sec to 325 cm/sec (6.6 ft/sec to 10.7 ft/sec) in an exhaust duct 44 connected to outlet 42. In some embodiments, the axial flow velocity is from 25 cm/sec to 35 cm/sec in the chamber 22 and from 250 cm/sec to 280 cm/sec in the exhaust duct 44.

A low sweep gas axial flow velocity and lower tumbling speed minimize polysilicon product losses from the tumbler drum 10, but are less effective at removing powder. At higher rotating speeds that produce more chaotic granular flow and higher sweep gas flows that provide more effective dust removal and polishing process, unacceptably high yield losses may occur with up to 10 wt % of the initial bed of material being removed, of which less than half may be attributable to dust or powder.

Advantageously, a helical vane or vanes 45 may be located within the exhaust duct 44 of the tumbler drum 10. The exhaust duct 44 may have a cylindrical configuration. Desirably, the exhaust duct 44 has a circular cross-section and the helical vane 45 has an outer diameter D2 similar to an inner diameter (i.e., 2×r) of the exhaust duct 44. Any gap existing between an outer edge 45*a* of the helical vane 45 and an inner surface 44*a* of the exhaust duct 44 is smaller than an average diameter of the polysilicon granules. In some embodiments, the helical vane 45 has an outer diameter D2 that is the same as the inner diameter (2×r) of the exhaust duct 44, and there is no gap between the outer edge 45*a* of the helical vane 45 and the inner surface 44*a* of the exhaust duct 44. Advantageously, the helical vane 45 may not include a central shaft. Instead, the helical vane 45 is affixed to a surface within the exhaust duct 44. The helical vane 45 may be affixed to an interior surface of the exhaust duct 44 by any suitable means, including but not limited to welding, use of bolts, or adhesive bonding.

In the illustrated embodiment of FIG. 2, the drum 10 is rigidly attached to the exhaust duct 44 and the helical vane 45 is attached to the exhaust duct 44. As the tumbler drum 10 and the exhaust duct 44 rotate, the helical vane 45 also rotates. The helical vane 45 is configured such that dust and powder particles remain entrained in the sweep gas and flow past the vane 45 to the dust collection assembly 14. Larger particles fall and are conveyed to the chamber 22 in a direction countercurrent to the sweep gas flow as the exhaust duct 44 and helical vane 45 rotate. The helical vane 45 has a height h2, as measured from the inner surface 44*a* of the exhaust duct 44, that is sufficient to induce a swirling flow pattern and centrifugal force in the sweep gas with entrained polysilicon dust and granular particles flowing through the exhaust duct 44, the centrifugal force being effective to separate the granular particles (e.g., particles having an average diameter greater than 0.25 μm) from the sweep gas and dust particles. However, the helical vane height h2 is not so great as to induce excessive resistance to gas flow. In some embodiments, the helical vane height h2 is from 0.25× to 0.75× a radius r of the exhaust duct 44.

Initially as the sweep gas with entrained polysilicon dust and granular particles enters the exhaust duct 44 through outlet 42, flow will be across the helical vane 45. The helical vane 45 induces gas flow eddies. The sweep gas flow velocity rate upon entry to the exhaust duct is sufficiently low to allow some solids (i.e., granular particles having an average diameter greater than 250 μm) to disengage from the sweep gas flow stream. As the sweep gas travels farther down the exhaust duct 44, the angular velocity of the flow field increases and becomes more aligned with the turns of the helical vane 45. This rotating flow produces a centrifugal force that causes the larger particles to move outward towards the inner surface 44*a* of the exhaust duct 44. Due to the friction forces imposed on the gas from the wall surface 44*a* and the vane surface 45*b*, a boundary layer will form with the lowest velocities immediately next to these surfaces. When the larger particles reach these areas of lower velocity, they will no longer be entrained in the sweep gas current and their motion will be more influenced by gravity. These separated particles will accumulate along the lower portion of the exhaust duct 44 between turns of the helical vane 45. With the helical vane 45 rotating along with the chamber 22 and exhaust duct 44, and the helical pitch being such that as the particles climb the inner surface 44*a* of the rotating exhaust duct and fall down against the helical vane 45, they would be directed axially back into the chamber 22 against the sweep gas flow. The presence of the helical vane 45 may reduce product (i.e., polysilicon granules) loss to less than 2 wt % or less than 1 wt % of the weight of the initial charge placed into the drum.

In an independent embodiment, a screen may be placed within cylindrical exhaust duct 44 to block solids from entering the dust collection assembly 14. For example, a 25-mesh to 60-mesh nylon screen may be placed within cylindrical exhaust duct 44. In such embodiments, a pulse of cleaning gas may be periodically applied to the downstream side of the screen to provide a reverse flow and clear accumulated particles from the upstream side of the screen.

Rotation of the tumbler drum 10 produces a tumbling or churning of the polysilicon material in the drum. Embodiments of the disclosed tumbler drum 10 create two different flow paths for the bed of granular silicon loaded within the drum: (1) a primary transverse flow, and (2) a secondary transverse flow. Primary transverse flow is flow created by side wall, interparticle, gravity, and centrifugal forces acting on the bed of granular silicon loaded within the drum. Secondary transverse flow is flow created by an interaction between a localized portion of the bed of granular silicon and the geometry of the of the side wall, i.e., lifting vanes or transitions between facets of the side wall 20 itself when the side wall has a multi-sided faceted interior surface 21 such as when the side wall 20 has an inner surface 21 that, in transverse cross-section, is a triangle, a square, a pentagon, etc. Secondary transverse flow causes the affected material to be projected or lifted above the bed and dispensed over the bed or projected into the bed or an opposing portion of the side wall 20 as further described below. These flows are dependent upon the drum cross-sectional area, rotational speed, bed depth, particle geometry (size, size distribution, shape, and roughness), lifting vanes (height, pitch angle, and quantity) the roughness of the drum's inner surface, and the kinetic coefficient of friction between the drum's inner surface and the polysilicon material. The various types of primary transverse flow regimes are shown in FIGS. 7A-7F, with the solid arrows indicating the primary transverse flow.

A slipping flow regime (FIG. 7A) is characterized by a stable sliding bed. This occurs at low speeds with a bed of product 25 that has higher interparticle friction (or mechanical locking due to the geometry of the particles within the bed) than bed to drum friction. In this case, a bed of material 25 will climb the upwardly rotating side 20 of the drum to a point where the tangential component of gravitational forces balances the friction forces resulting in the particles having little to no relative motion within the bed with only the lower surfaces contacting the rotating drum.

A slumping flow regime (FIG. 7B) occurs at low speeds where friction between the bed 25 and the drum wall 20 is sufficient to lift a cohesive bed to a point until the tangential component of gravitational forces exceeds the friction forces. With the bed remaining cohesive, it slips back to a point where friction once again exceeds the tangential gravitational forces and moves the bed 25 up the rotating side 20 again and repeats the cycle. A person of ordinary skill in the art understands that both slipping and slumping flow regimes are only possible with a smooth-walled drum without lifting vanes.

A rolling flow regime (FIG. 7C) is established when the forces acting on the bed 25 from lifting vanes (not shown) or particle to wall friction in a smooth walled drum that exceeds the cohesive forces of the bed, the bed 25 climbs the upwardly rotating side 20 and establishes a stable position with the particles moving upward along the cylinder's wall 20 and then sliding over the bed 25 in a recirculating pattern. A rolling flow regime occurs at lower speeds and may have significant stratification taking place within the middle of the bed where a stable rotation pattern is formed.

Figures 7A, 7B, 7C, 7D, 7E, 7F:
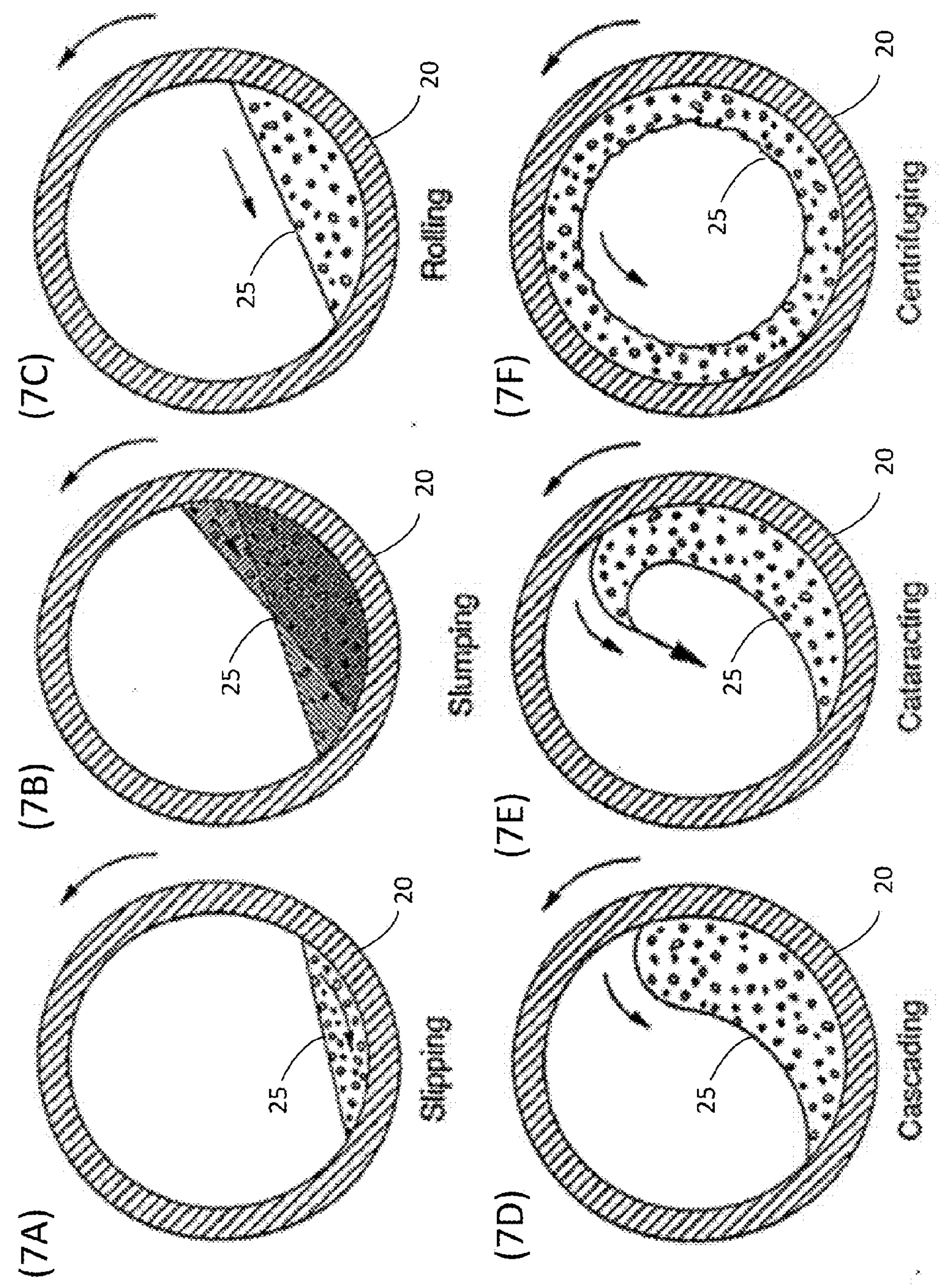
FIGS. 7A-7F are schematic drawings illustrating primary transverse flow regimes within a tumbler drum.

As rotation speeds are increased, more of the bed 25 climbs the upwardly rotating side 20 of the drum and a standing wave is formed. This is known as a cascading flow regime (FIG. 7D). With a significant amount of the bed 25 flowing over itself in a turbulent mixing action, small rotating pocket(s) in the center are likely unstable with material entering and exiting these vortices.

As the speeds continue to increase, the standing wave pattern transitions to a breaking wave with material free falling on the bed 25 below. This is known as a cataracting flow regime (FIG. 7E).

At even higher speeds where centrifugal forces equal gravitational forces, a centrifuging flow regime (FIG. 7F) is established. The minimum speed for this transition is called the Critical Speed and is determined by the following equation:

$$N_c=76.6(D)^{-1/2}$$

$N_c$ is the critical speed, in revolutions per minute, and D is the mill effective inside diameter, in feet. As an example, the critical speed for a tumbler drum having an inner diameter of 6 feet is 31.3 rpm.

Figure 8:
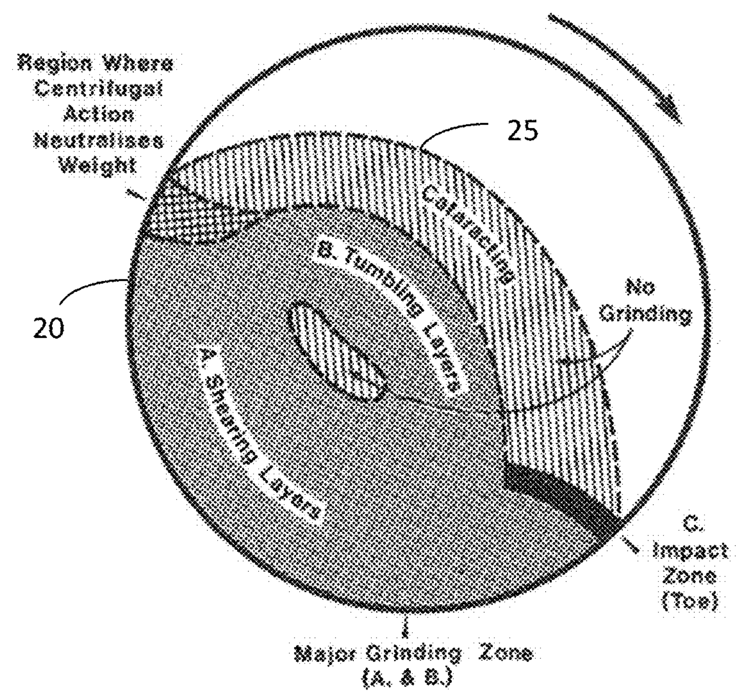
FIG. 8 is a schematic drawing illustrating a bed transitioning from cascading to cataracting flow within a tumbler drum.

FIG. 8 shows a bed 25 transitioning from cascading to cataracting flow. Areas of the bed 25 depicted in the tumbling and shearing layers (A and B), which represent the cascading flow, have a significant amount of tangential relative motion which is effective in making the material self-grinding. The material that is projected from the upwardly rotating side wall 20 of the bed and lands in the opposite lower end in an area that is referred to as the impact zone (C) or toe represents the cataracting flow, which primarily results in compressive forces applied to the particles.

With the cataracting flow regime, centrifugal forces lift material and dispense it over the lower portion of the bed. It is possible to achieve this action while operating at lower speeds by using lifting vanes, which create a secondary flow path by trapping a pocket of material between the vanes and the cylindrical wall. As the drum rotates, the position of the lifting vane moves from within the bed to the top of the rotating cylinder. The pocket of material trapped by the vane is dispensed over the bed as the lifting vane changes its orientation from horizontal to vertical and its position passes over the bed. Lifting vanes also prevent tangential flow between the bed and the cylindrical wall which provides the benefits of reducing inner surface erosion and consequential product contamination from the erosion products.

Figure 9:
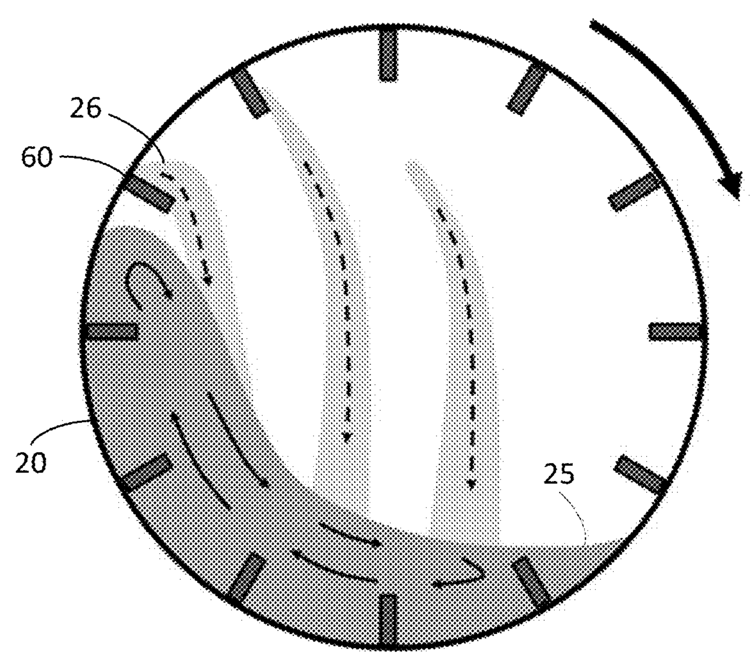
FIG. 9 is a schematic drawing illustrating both primary transverse flow and lifting vane flow of a bed within a tumbler drum.

FIG. 9 illustrates both the primary transverse flow (solid arrows in bed 25) and the secondary transverse, or lifting vane, flow (dashed arrows). The quantity of vanes 60, height relative to bed height, and pitch angle determine the fraction of material diverted to vane flow. A pitch angle with sufficient magnitude to trap material, establishes the timing of the discharge of each pocket 26. An acute pitch angle, as shown on the right in FIG. 5, will start dispensing the pocket 26 earlier and will be vertical prior to the 12 o'clock position. A 90-degree pitch angle, as shown on the left in FIG. 5, will be vertical at the 12 o'clock position. Increasing the pitch angle beyond 90 degrees will have the effect trapped material not falling, thereby transitioning to a centrifuging flow at lower speeds; consequently, this is not desired. By adjusting the resultant forces on the material trapped behind the vane 60 by varying rotating speed, drum diameter and vane pitch angle, the trajectory of the vane flow can be adjusted such that the material is projected just past the upwelling portion of the bed 25, projected to the middle or lower portions of the bed 25, or projected beyond the bed 25 to the opposite side of the horizontal cylinder. The vane height plays a role as well. With deeper pockets 26 taking longer to drain, material can be dispensed over and beyond the lower portion of the bed 25 at lower speeds.

Surface modification of the granular silicon processed in a tumbler drum occurs as a result of inter-particle collisions with both normal and tangential velocity components. The collision force component aligned in the normal direction produces compressive forces that fractures surface features and reduces the size of dust particles that are struck between the granules. The inertial forces produced in these collisions cause dust particles trapped within crevices and pores to be released. The collision force component aligned in the tangential direction cause surface features to be either sheared or fractured and also cause dust that is loosely attached to flat or convex features to be released through a wiping action. To maximize the amount of material that is ground and polished, it is desired to establish a cascading flow regime, which produces increased particle velocities with all of the particles within the bed remaining in contact with each other and undergoing a significant amount of tangential collisions. The cataracting flow regime will have higher velocities, but will have particles in free flight which will not be ground at that time and will, upon landing, undergo more normal collisions. The typical speed range to achieve cascading flow is somewhere between 55 to 75% of the critical speed. Thus, in some embodiments, the rotation speed is selected to provide a cascading flow regime. In some embodiments, a two-stage separation is performed with a first rotational speed at a lower end of the speed range (e.g., 55-75% or 55-65% of the critical speed) to remove free dust and a subsequent, increased rotational speed (e.g., 65-90%, or 70-85% of the critical speed) that approaches a cataracting flow regime to remove attached features that could otherwise be broken away or removed by attrition when the granules are handled, e.g., during packing and/or transport.

Figure 10C:
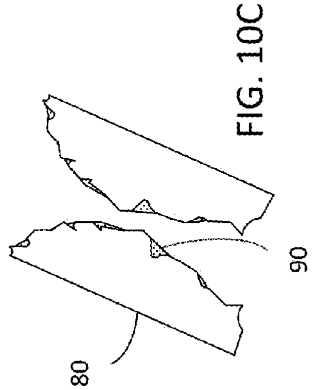
FIGS. 10A-10C are partial schematic views of silicon granules inside a tumbler drum.
Figure 10A:
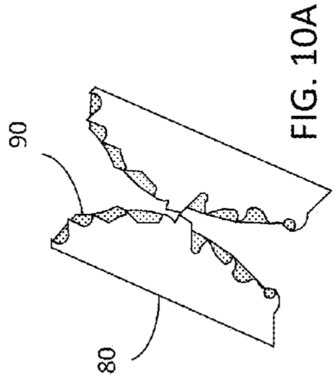
Figure 10B:
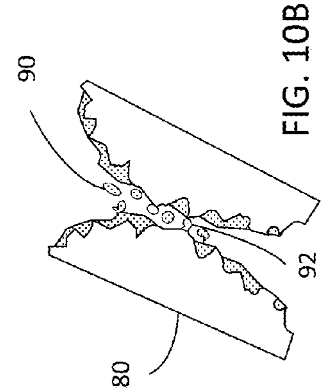

FIGS. 10A-10C schematically illustrate the surface modification of the granular silicon during tumbling. Initially, rough surfaces of granules 80 entrap powder 90 (FIG. 10A). As the granules are tumbled, the normal and tangential collision force components release powder 90 and polish rough surface features on the granule thereby mechanically removing small particles 92 (FIG. 10B). Released powder 90 and small particles 92 are removed by the sweep gas via outlet 42. The resulting silicon granules 80 have smoother surfaces with less surface powder 90 (FIG. 10C).

Additionally, as the tumbler drum 10 rotates, the one or more lifting vanes 60 carry a portion of the polysilicon material upward. As each lifting vane 60 rotates upward past a horizontal orientation, the polysilicon material carried by that lifting vane falls downward. The sweep gas flowing through the chamber 22 entrains at least a portion of the falling polysilicon powder, which is carried out of the chamber 22 through outlet 42. The entrained polysilicon powder may be collected by any suitable means, such as by flowing the exiting gas and entrained powder through a filter. At sufficiently low sweep gas flow rates and/or tumbling speeds, granular polysilicon is not entrained by the flowing gas and remains in the chamber 22. However, lower gas flow rates and/or rotational speeds may be less effective at removing dust and polishing the polysilicon granules. Thus, sweep gas flow rate and/or rotational speed may be increased to improve efficacy. Any granular polysilicon swept into the cylindrical exhaust duct 44 by the higher gas flow rate and/or rotational speed is returned to the chamber 22 by rotation of helical vane 45, thereby minimizing granular product loss. After a period of time, rotation and sweep gas flow cease, and the chamber 22 is emptied via port 50. The polysilicon material removed from the chamber 22 includes a reduced percentage by weight of polysilicon powder than the material introduced into the chamber.

In one embodiment, the tumbling process is a batch process wherein a quantity of polysilicon material is introduced into the chamber 22 via port 50. After processing as described above, the tumbled polysilicon material is removed from the chamber 22, and another quantity of polysilicon material is introduced into the chamber 22.

In one exemplary arrangement, a tumbler drum 10 has a capacity of 1000-2000 kg polysilicon. The chamber 22 is partially defined by tumbler side wall 20 that has an inner surface that is a cylinder of circular cross-section with a uniform diameter of 150-200 cm and a length of 100-130 cm. The tumbler drum includes 1 to 20 lifting vanes 60, such as from 5-15 or 10-12 lifting vanes. Each lifting vane 60 may have a height from 7.5 cm to 40 cm, such as from 15-30 cm. The tumbler drum also may include a plurality of intermediate supports 70. The tumbler drum 10 may be filled with a mixture of granular polysilicon and polysilicon powder to a depth that does not obstruct the gas inlet 32 and/or outlet 42. Thus, the tumbler drum may be filled to a depth of 50-80 cm with the mixture. In this arrangement, the tumbler drum may be operable to rotate at 5-30 rpm.

To reduce contamination of granular silicon and polysilicon powder due to contact with surfaces within the tumbling device, all of a portion of the inner surfaces of the side wall 20, the first end wall 30, the second end wall 40, or a combination thereof may comprise quartz, silicon carbide, silicon nitride, silicon, or a combination thereof. In one arrangement, the side wall 20, the first end wall 30, the second end wall 40, or a combination thereof is constructed of, or lined with, quartz.

In another embodiment, polysilicon contamination is reduced by coating at least a portion of the inner surface 21 of the side wall 20, the inner surface of first end wall 30, and/or the inner surface of second end wall 40 with polyurethane, polytetrafluoroethylene (PTFE, Teflon® (DuPont Co.)), or ethylene tetrafluoroethylene (ETFE, Tefzel® (DuPont Co.)). Advantageously, at least a portion of an outer surface of lifting vane 60, intermediate support 70, and/or helical vane 45 also may be coated with polyurethane, PTFE, or ETFE. As used herein, the term "polyurethane" may also include materials where the polymer backbone comprises polyureaurethanes or polyurethane-isocyanurate linkage. The polyurethane may be a microcellular elastomeric polyurethane.

The term "elastomeric" refers to a polymer with elastic properties, e.g., similar to vulcanized natural rubber. Thus, elastomeric polymers can be stretched, but retract to approximately their original length and geometry when released. The term "microcellular" generally refers to a foam structure having pore sizes ranging from 1-100 μm.

Microcellular materials typically appear solid on casual appearance with no discernible reticulate structure unless viewed under a high-powered microscope. With respect to elastomeric polyurethanes, the term "microcellular" typically is defined by density, such as an elastomeric polyurethane having a bulk density greater than 600 kg/m$^3$. Polyurethane of lower bulk density typically starts to acquire a reticulate form and is generally less suited for use as the protective coating described herein.

Microcellular elastomeric polyurethane suitable for use in the disclosed application is that having a bulk density of 1150 kg/m$^3$ or less, and a Shore Hardness of at least 65 A. In one embodiment the elastomeric polyurethane has a Shore Hardness of up to 90 A, such as up to 85 A; and from at least 70 A. Thus, the Shore Hardness may range from 65 A to 90 A, such as 70 A to 85 A. Additionally, the suitable elastomeric polyurethane will have a bulk density of from at least 600 kg/m$^3$, such as from at least 700 kg/m$^3$ and more preferably from at least 800 kg/m$^3$; and up to 1150 kg/m$^3$, such as up to 1100 kg/m$^3$ or up to 1050 kg/m$^3$. Hence, the bulk density may range from 600-1150 kg/m$^3$, such as 800-1150 kg/m$^3$, or 800-1100 kg/m$^3$. The bulk density of solid polyurethane is understood to be in the range of 1200-1250 kg/m$^3$. In one embodiment, the elastomeric polyurethane has a Shore Hardness of from 65 A to 90 A and a bulk density of from 800 to 1100 kg/m$^3$.

Elastomeric polyurethane can be either a thermoset or a thermoplastic polymer; this presently disclosed application is better suited to the use of thermoset polyurethane, particularly thermoset polyurethane based on polyester polyols. Microcellular elastomeric polyurethane having the above physical attributes is observed to be particularly robust, and withstands the abrasive environment and exposure to particulate granulate silicon eminently better than many other materials.

Figure 11:
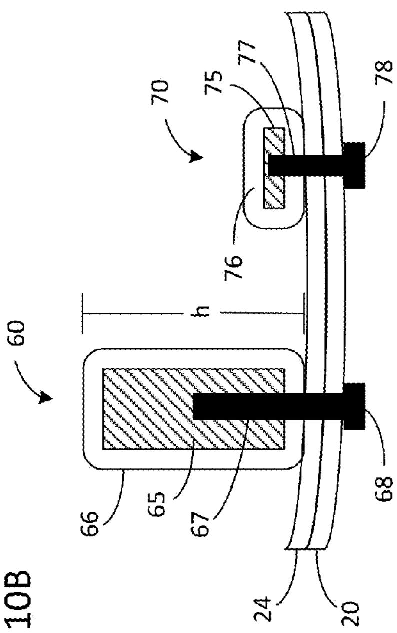
FIG. 11 is a partial cross-sectional schematic view of a tumbler drum having a lifting vane and an intermediate support.

In some embodiments, lifting vanes 60 and/or intermediate supports 70 comprise a metal core encapsulated with polyurethane. FIG. 11 is an expanded cross-section showing one embodiment of a lifting vane 60, an intermediate support 70, and a portion of the wall 20 shown in FIG. 5. Lifting vane 60 comprises a metal core 65, wherein the metal core 65 is encapsulated with a polyurethane layer 66. Similarly, intermediate support 70 comprises a metal core 75, wherein the metal core 75 is encapsulated with a polyurethane layer 76. Metal cores 65, 75 may be drilled and tapped. The taps 67, 77 extend through wall 20 and are secured by bolts 68, 78. In another embodiment, metal cores 65, 75 are hollow and include a threaded section formed within the core or a threaded nut welded within the core. In such embodiments, a threaded screw may be used to secure the taps to wall 20.

In some embodiments, a polyurethane coating 24 is applied to an inwardly facing surface of wall 20 (FIGS. 4, 11). The polyurethane coating 24 may be secured by any suitable means. In one embodiment, the polyurethane coating 24 is cast in situ and adheres to side wall 20 as it is cast. In another embodiment, the polyurethane coating 24 is secured to side wall 20 using a bonding material, e.g., an epoxy such as West System 105 Epoxy Resin® with 206 Slow Hardener® (West System Inc., Bay City, Mich.). In another embodiment, the polyurethane coating 24 is secured to side wall 20 using double-sided adhesive tape, e.g., 3M™ VHB™ Tape 5952 (3M, St. Paul, Minn.). In still another embodiment, as shown in FIG. 11, the polyurethane coating 24 is secured by lifting vane 60 and bolt 68, and/or by intermediate support 70 and bolt 78.

The polyurethane coating 24 on the inner surface of side wall 20 and/or the outer surfaces of the lifting vanes 60 and/or intermediate supports 70 typically will be present in an overall thickness of from at least 0.1, such as from at least 0.5, from at least 1.0, or from at least 3.0 millimeters; and up to a thickness of about 10, such as up to about 7, or up to about 6 millimeters. Thus, the polyurethane coating 24 may have a thickness from 0.1-10 mm, such as 0.5-7 mm or 3-6 mm.

II. CLASSIFIER

Figure 12:
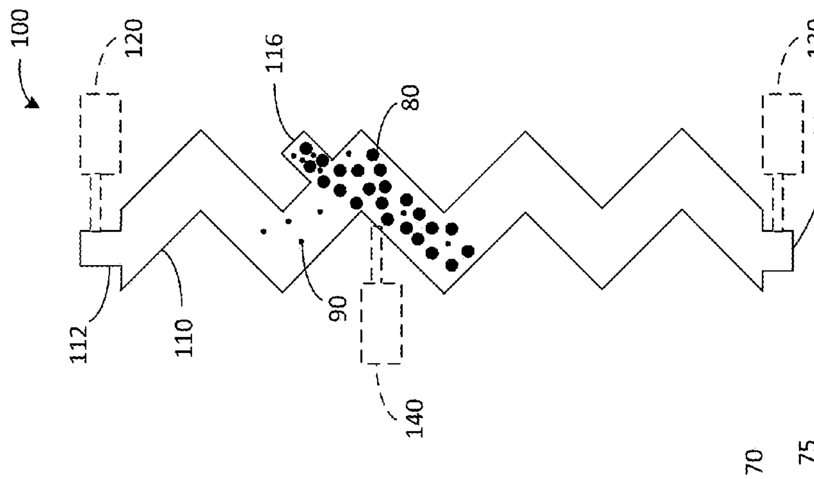
FIG. 12 is a vertical cross-sectional schematic view of a zigzag classifier.

The apparatus for separating granular polysilicon and polysilicon powder may further include one or more zigzag classifiers, such as zigzag classifier 100 shown in FIG. 12. Zigzag classifier 100 includes a baffle tube 110 having a zigzag configuration, an upper opening 112, a lower opening 114, and an intermediate port 116 positioned between the upper opening 112 and the lower opening 114. In some embodiments, internal surfaces of the baffle tube may be partially or completely coated with a layer of polyurethane as described above. In one arrangement, a vacuum source 120 and an intervening filter (not shown) are fluidly connected to the upper opening 112 to maintain a negative pressure at the upper opening 112, thereby providing an upward flow of gas through the baffle tube. In an alternate arrangement, an external gas source 130 is fluidly connected to the lower opening 114 to provide an upward flow of gas through the baffle tube 110. In yet another arrangement, an external source 140 of a cross-flowing gas is provided below intermediate port 116. Suitable gases for up-flow or cross-flow include nitrogen or an inert gas, such as helium or argon.

A polysilicon material that is a mixture of granular polysilicon 80 and polysilicon powder 90 is introduced into the baffle tube 110 via the intermediate port 116. In one embodiment, the material is introduced via a vibrating feeder (not shown). The material may be introduced through a polyurethane tube (not shown). As the material traverses downward through the baffle tube 110, at least a portion of the polysilicon powder 90 is entrained in air, or inert gas, flowing upward from lower opening 114 to upper opening 112. Upward gas flow is produced by an external gas source 130 fluidly connected to lower opening 114. Alternatively, upward gas flow is produced by action of the vacuum source 120, which maintains a negative, or sub-ambient, pressure at the baffle tube 110 and upper opening 112, and draws ambient air or gas up through the baffle tube 110. Entrained polysilicon powder 90 is removed through upper opening 112, and a polysilicon material comprising granular polysilicon 80 and a reduced quantity of polysilicon powder 90 is collected through lower opening 114.

A person of ordinary skill in the art understands that zigzag classifiers operate under Stoke's law, whereby the opposing forces of aerodynamic drag produced from an upward flow of a fluid and the downward gravitational force determine the direction of motion of an object. The density, cross sectional area presented to the moving fluid, surface roughness, and fluid speed and direction determine the resulting direction of the object. If the drag forces are greater, the object will move upward with the moving fluid, conversely, if gravitational forces are greater, the object will fall. Silicon granules have a density of approximately 2.0 g/cm$^3$. When a zigzag classifier has an angle between stages of approximately 120°, a gas velocity of 6-7 m/s is required to lift particles smaller than 0.25 mm (i.e., powder particles) and allow the larger particles to fall.

III. METHODS OF SEPARATING POLYSILICON GRANULES AND POWDER

The tumbling device may be used independently to separate granular polysilicon and polysilicon powder. In an alternative arrangement, the tumbling device and the zigzag classifier are combined in series, in any order, to separate granular polysilicon and polysilicon powder.

In one embodiment, a polysilicon material that is a mixture of granular polysilicon and polysilicon powder is introduced into the tumbling device. Following the tumbling process, tumbled polysilicon material comprising granular polysilicon and a reduced percentage by weight of polysilicon powder is removed from the tumbling device. The initial polysilicon material may comprise from 0.25% to 3% powder by weight. In some embodiments, the tumbled polysilicon material comprises less than 0.1% powder, such as less than 0.05% powder, less than 0.02% powder, less than 0.015% powder, less than 0.01% powder, or even less than 0.001% powder by weight.

In an independent embodiment, the tumbled polysilicon material is then introduced into the zigzag classifier, whereby additional polysilicon powder is removed and a polysilicon material comprising granular polysilicon is collected from the lower outlet of the zigzag classifier.

In another independent embodiment, the polysilicon material introduced into the tumbler device is formed by flowing an initial mixture of granular polysilicon and polysilicon powder through the zigzag classifier. An intermediate polysilicon material comprising granular polysilicon and a reduced percentage by weight of polysilicon powder is collected from the lower outlet of the zigzag classifier. The intermediate polysilicon material then is introduced into the tumbling device. Following the tumbling process, a tumbled polysilicon material comprising granular polysilicon is removed from the tumbling device. In some embodiments, the tumbled polysilicon material comprises less than 0.1% powder, such as less than 0.05% powder, less than 0.02% powder, less than 0.015% powder, less than 0.01% powder, or even less than 0.001% powder by weight.

In another independent embodiment, a mixture of granular polysilicon and powder is classified through the zigzag classifier, tumbled in the tumbler device, and then classified again through the same zigzag classifier or another zigzag classifier.

The polysilicon material may undergo an annealing process before or after processing through the tumbler device and/or the zigzag classifier. Annealing heats the surface of polysilicon granules to a temperature sufficient to adhere at least a portion of any powder to the granules. At elevated temperatures below the melting point, granular particles with high surface energy are able to attain lower energy that results in fusion of dust particles to the granular surface and relatively fine surface features, producing a particle with smoother contours. Annealing also removes entrapped hydrogen from the granules. Annealing may be performed by heating the polysilicon material at a temperature from 1000° C. to 1300° C. for an effective period of time, such as for up to four hours. For example, the polysilicon material may be annealed at 1050-1250° C., such as from 1150-1200° C., for 30 minutes to four hours, e.g., for 30 minutes, 60 minutes, 90 minutes, 120 minutes, or 240 minutes. Annealing may be performed in an inert gas atmosphere. Suitable inert gases include argon, helium, neon, xenon, krypton, or combinations thereof. In some embodiments, the inert gas is argon or helium. Granules of the silicon material may remain static (static batch) or be moved, or agitated, during the annealing process by any suitable means including, but not limited to, a fluidized bed, a moving bed (e.g., vertical dense phase flow), a horizontal rotary tube, or a horizontal pusher furnace (semi-continuous). The annealed polysilicon material is cooled before further processing. In some examples, tumbling alone produces a polysilicon material comprising less than 0.001% powder, such as 0.0008% powder. In one example, a combination of tumbling and subsequent annealing produced a polysilicon material comprising 0.0002% powder.

IV. EXAMPLES

Powder Quantification

Two methods were used to quantify powder/dust. In the boil method, a 10-gram sample of granular polysilicon product was placed in a beaker of water and heated to the boiling point for a period of time. The water was subsequently cooled and filter through a pre-weighed 0.2 μm filter. The filter was dried and weighed. The percent dust was calculated by dividing the weight of dust on the filter by the initial weight of the granular sample and multiplying by 100. In the ultrasonic method, a 10-gram sample of granular polysilicon product was placed in a beaker of water, which was then placed in an ultrasonic bath for a period of time. The water was then filtered and the percent dust calculated as described for the boil method. The ultrasonic method produced higher dust measurements, indicating that in addition to easily removed dust, some fragile microscopic structure is removed as well. Consequently, the boil method was used to indicate the amount of free dust whereas the ultrasonic method was used to indicate total dust levels that include free dust and dust that would otherwise be produced via attrition during subsequent shipping and handling of the granular polysilicon product.

Granular polysilicon produced in a fluid bed reactor (e.g., as described in U.S. Pat. No. 8,075,692) was analyzed for its dust content. Different vane configurations and time/rotational speed combinations were evaluated. The vanes had a rectangular configuration and a pitch of 90° (see, e.g., vanes 60, FIG. 4). The parameters are shown in Table 1, where airflow is measured in SCFM (standard cubic feet per minute), the measurements of dust collected in the Torit dust collector are in kg, and speed is in RPM (revolutions per minute). The quantity of granular polysilicon in each run was 1200 kg.

TABLE 1

| Run | Airflow | Vane Configuration | Screen | Torit <60 Mesh | Torit >60 Mesh | Torit Total | Time 1 | Speed 1 | Time 2 | Speed 2 | Time 3 | Speed 3 | Time 4 | Speed 4 |
|---|---|---|---|---|---|---|---|---|---|---|---|---|---|---|
| P-1 | 900 | (12) 6" | none | | | | 240 | 6.5 | 120 | 12 | | | | |
| P-2 | 1400 | (12) 6" | none | 15.9 | 44.1 | 60 | 120 | 20 | | | | | | |
| P-3 | 1250 | (12) 6" | none | 3.1 | 5.9 | 9 | 120 | 12 | | | | | | |
| P-4 | 1340 | (12) 6" | none | 10.7 | 46.3 | 57 | 120 | 17 | | | | | | |
| P-5 | 1200 | (8) 6" + (4) 10" | none | 11.5 | 107 | 118.5 | 90 | 20 | 30 | 26 | | | | |
| P-6 | 950 | (8) 6" + (4) 10" | none | | | 106 | 90 | 20 | 90 | | | | | |
| P-7 | 1000 | (8) 6" + (4) 10" | none | | | 94 | 120 | 26 | | | | | | |
| P-8 | 1140 | (8) 6" + (4) 10" | 25 Mesh | 30.4 | 34.6 | 65 | 60 | 20 | 60 | 26 | 60 | 20 | 30 | 25 |
| P-9 | 1125 | (8) 6" + (4) 10" | 60 Mesh | 14 | 0 | 14 | 90 | 20 | 30 | 26 | | | | |
| P-10 | 1130 | (8) 6" + (4) 10" | 60 Mesh | 13 | 0 | 13 | 90 | 20 | 30 | 26 | | | | |
| P-11 | 1106 | (8) 6" + (4) 10" | 60 Mesh | 12.4 | 0 | 12.4 | 90 | 20 | 30 | 26 | | | | |
| P-12 | 1093 | (8) 6" + (4) 10" | 60 Mesh | 14 | 0 | 14 | 90 | 20 | 30 | 26 | | | | |
| P-13 | 1125 | (8) 6" + (4) 10" | 60 Mesh | 12.8 | 0 | 12.8 | 90 | 20 | 30 | 26 | | | | |
| P-14 | 1146 | (8) 6" + (4) 10" | 60 Mesh | 10.4 | 0 | 10.4 | 90 | 20 | 30 | 26 | | | | |
| P-15 | 1076 | (8) 6" + (4) 10" | 60 Mesh | 9.6 | 0 | 9.6 | 90 | 20 | 30 | 26 | | | | |

Figure 13:
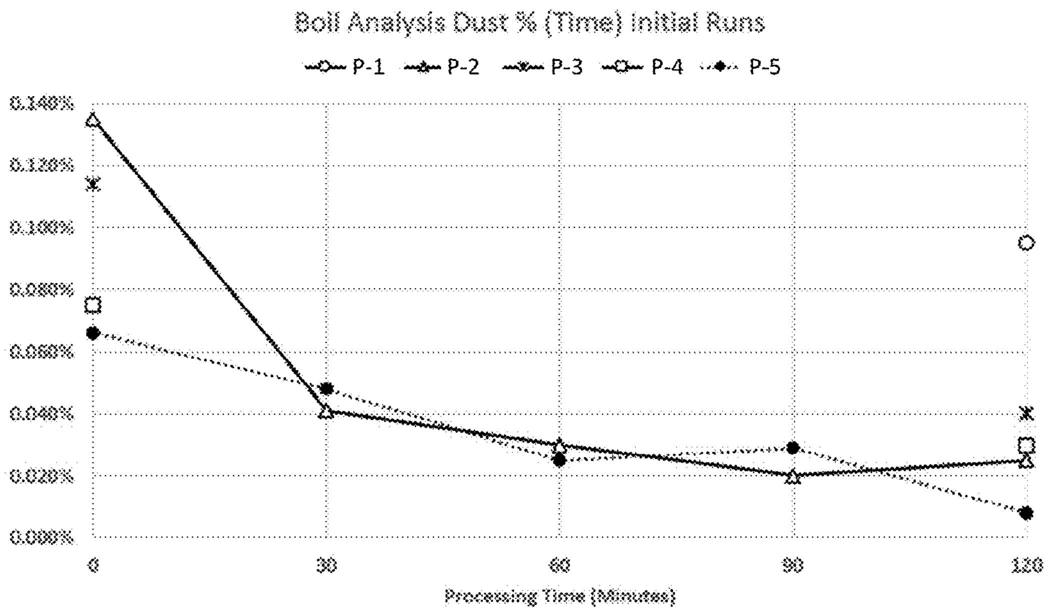
FIG. 13 is a graph of percent dust versus time showing the percent free dust remaining in several batches of granular polysilicon after tumbling under different conditions. The percent dust was determined by the boil analysis method.
Figure 14:
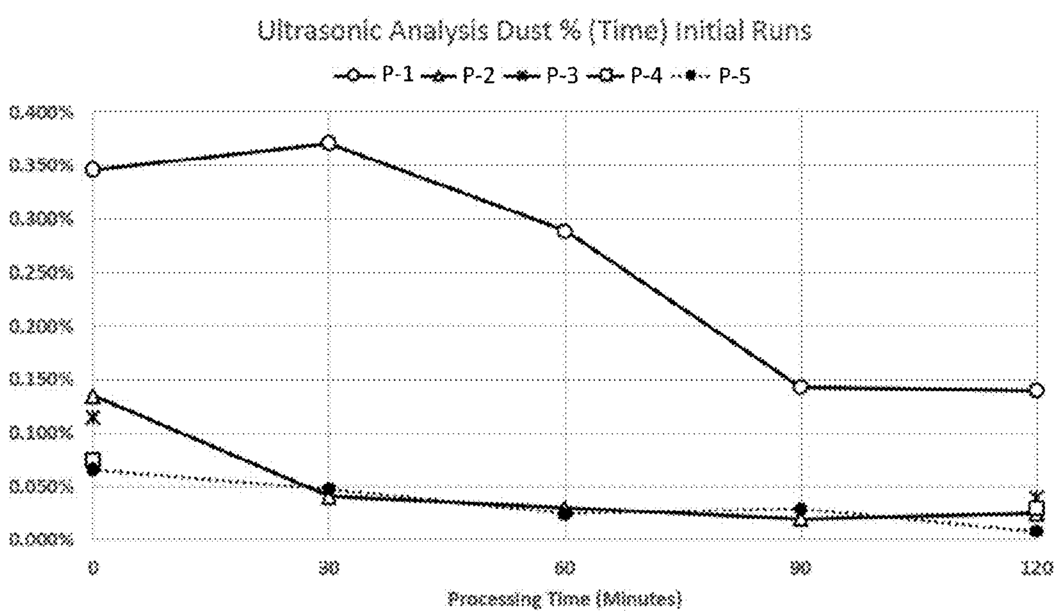
FIG. 14 is a graph of percent dust versus time showing the percent total dust remaining in the same batches of granular polysilicon evaluated in FIG. 13 after tumbling. The percent dust was determined by the ultrasonic analysis method.
Figure 15:
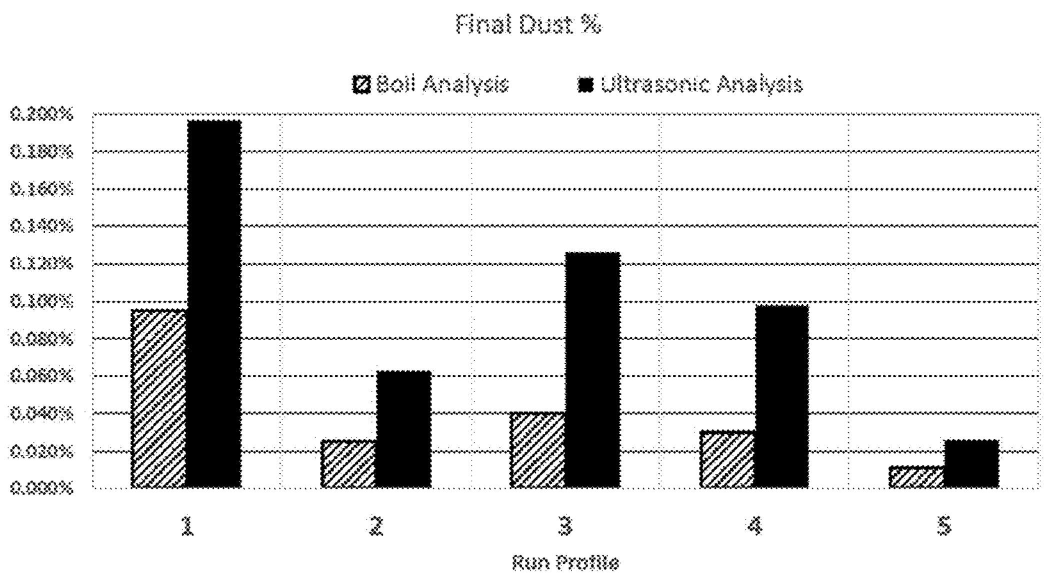
FIG. 15 is a bar chart comparing the free and total dust percentages of the batches of granular polysilicon evaluated in FIGS. 12 and 13 after 120 minutes of tumbling.

FIG. 13 shows the free dust content of several batches of granular polysilicon, as determined by the boil analysis method, after tumbling at the parameters and times shown in Table 1 for runs P-1, P-2, P-3, P-4, and P-5. FIG. 14 shows the total dust content of the same batches of granular polysilicon, as determined by the ultrasonic analysis method, after tumbling. FIG. 15 is a comparison of the final percent of dust determined by the boil analysis and the ultrasonic analysis for various run profiles.

Figure 16:
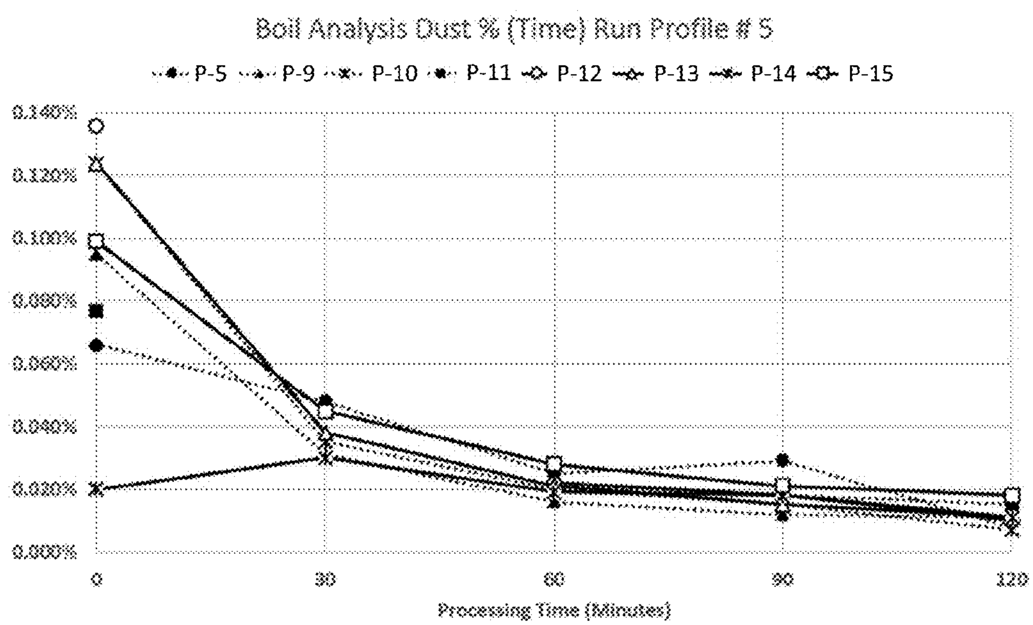
FIG. 16 is a graph of percent dust versus time showing the percent free dust remaining in several batches of granular polysilicon after tumbling under substantially the same conditions. The percent dust was determined by the boil analysis method.
Figure 17:
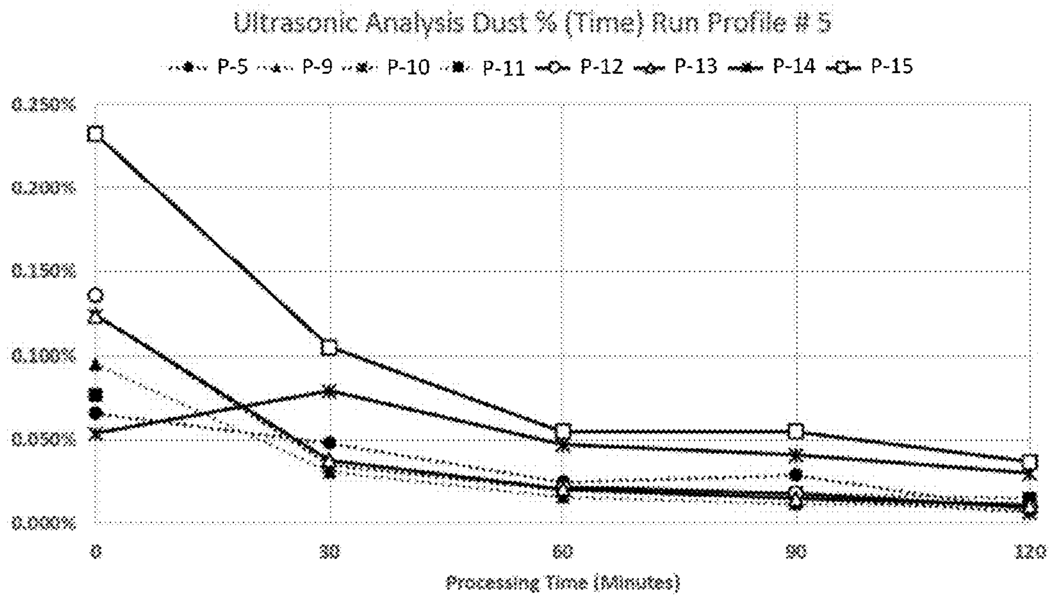
FIG. 17 is a graph of percent dust versus time showing the percent total dust remaining in the same batches of granular polysilicon evaluated in FIG. 16 after tumbling. The percent dust was determined by the ultrasonic analysis method.
Figure 18:
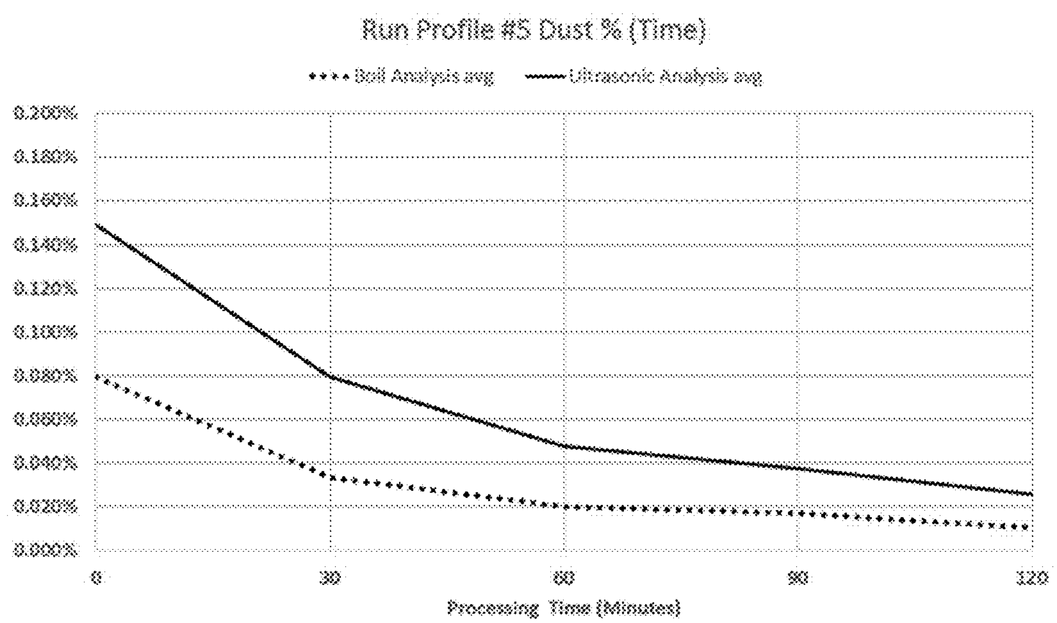
FIG. 18 is a graph of percent dust versus time showing the average percent free dust and total dust remaining in the batches of granular polysilicon evaluated in FIGS. 16 and 17 as a function of tumbling time.

FIG. 16 shows the free dust content of several batches of granular polysilicon as a function of tumbling time; free dust was determined by the boil analysis method. Each batch was run under substantially the same conditions, i.e., the conditions of run profile #5. FIG. 17 shows the total dust content of the same batches of granular polysilicon as a function of tumbling time; total percent dust was determined by the ultrasonic analysis method. FIG. 18 shows the average free and total percent dust remaining in the batches of granular polysilicon as a function of tumbling time under the conditions of run profile #5.

Based on the initial evaluations, run profile #5 was found to be the most efficient and effective. The run profile included operating the tumbler for the first 90 minutes at 20 rpm and increasing speed to 26 rpm for the final 30 minutes of the run. Axial sweep gas flows of around 1100 SCFM were used for dust removal. It is believed that by running at an optimum grinding speed of 20 rpm for the start of the run, the surface of the silicon granules will undergo an effective modification with cascading flow with tangential collisions. The lifting vane flow during this time will help removed trapped dust with impact collisions and the loose dust contained within the bed will be separated as it free falls over the bed, become airborne and removed with the sweep gas. The improvement seen during the 20 rpm operation is greater at first and then gradually declines to only a small improvement towards the 90 minute point. Based on observations seen from a video camera when stopping the tumbler at 30-minute intervals for samples, airborne dust levels seem to be constant throughout. This would indicate that a significant fraction of dust is produced from grinding. Once a sufficient level of polishing of the granules is performed to prevent future attrition, the speed is increased (e.g., from 20 rpm to 26 rpm) to reduce the amount of grinding through tangential collisions and to increase impact collisions. This is done by approaching the cataracting flow regime and creating a vane flow that projects more of the granular material beyond the bed and onto the opposite side of the horizontal cylinder. This reduces the amount of dust generation within the bed while increasing the amount liberated with inertial action with impact collisions.

Figure 19A:
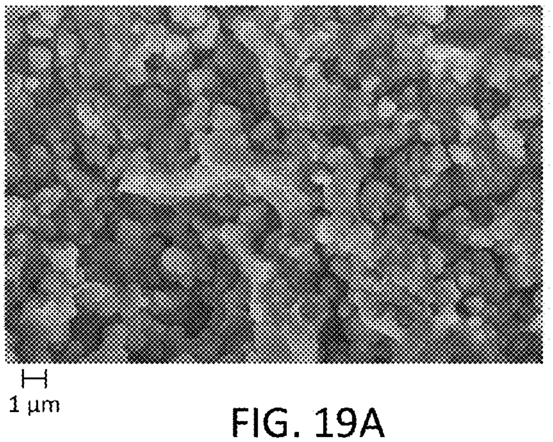
FIGS. 19A and 19B are scanning electron micrographs of ultrasonic water-washed, untumbled granular polysilicon; magnification=10,000λ.
Figure 19B:
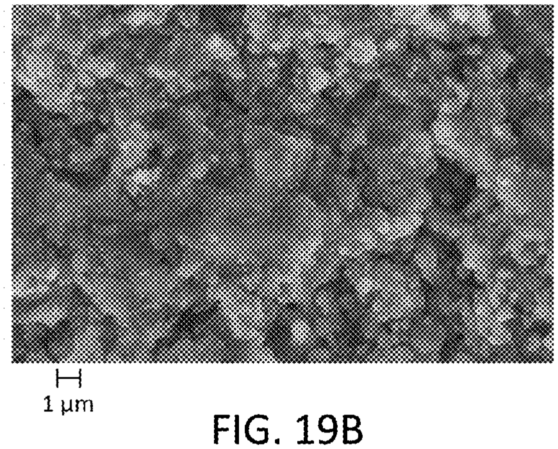
Figure 20A:
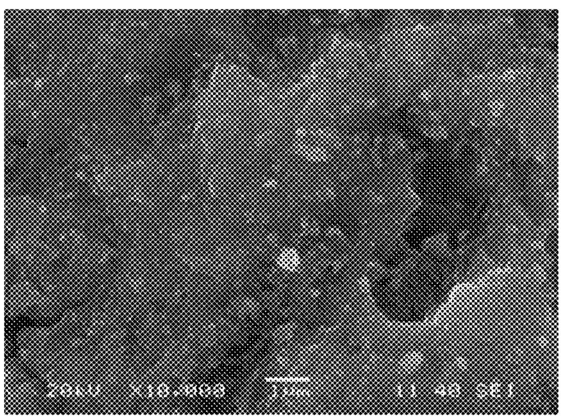
FIGS. 20A-20C are scanning electron micrographs of tumbled granular polysilicon; magnification=10,000λ.
Figure 20B:
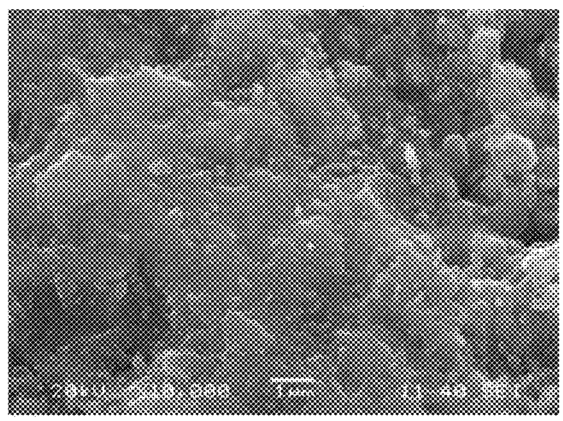
Figure 20C:
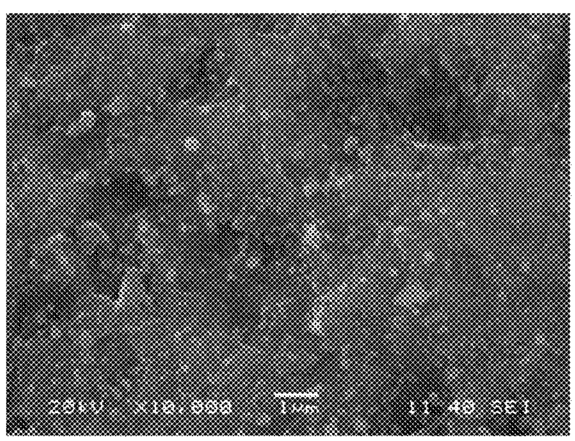

Micrographs of polysilicon granules after ultrasonic water washing without tumbling (FIGS. 19A and 19B) and after ultrasonic water washing and tumbling (FIGS. 20A-20C). FIGS. 20A-20C show distinct differences in the surface morphology of the granules after tumbling under the conditions of run profile #7 at 120 minutes (FIG. 20A), run profile #5 at 120 minutes (FIG. 20B), and run profile #6 at 180 minutes (FIG. 20C). The post-tumbled granules have a much more uniform, smooth surface.

Figure 21A:
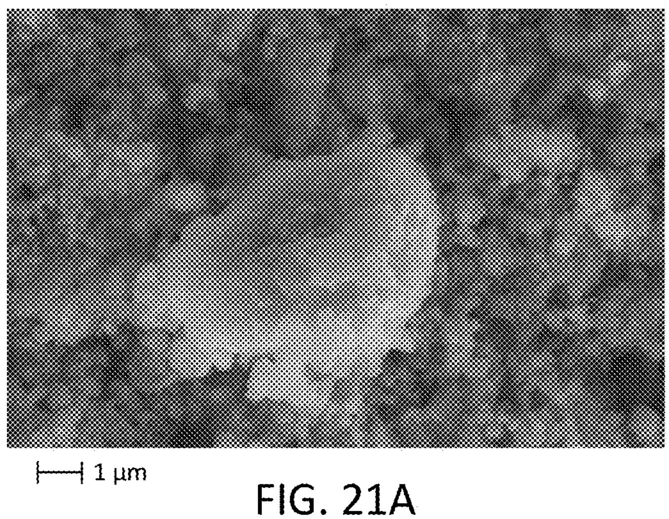
FIGS. 21A-21C are scanning electron micrographs of raw, ultrasonic water-washed, and annealed granular polysilicon; magnification=20,000λ.
Figure 21B:
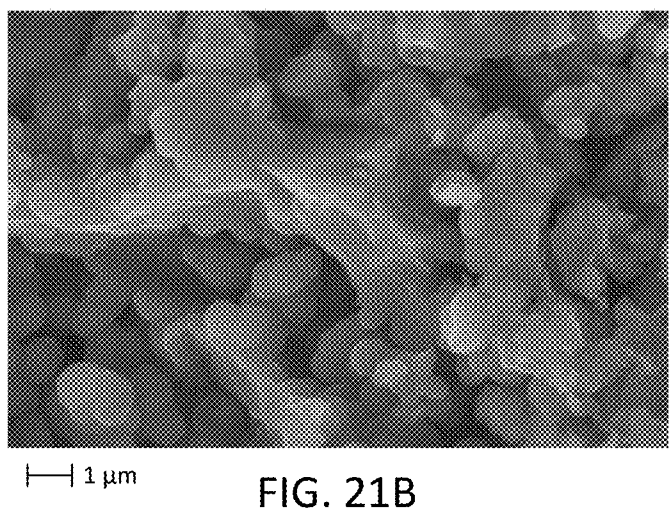
Figure 21C:
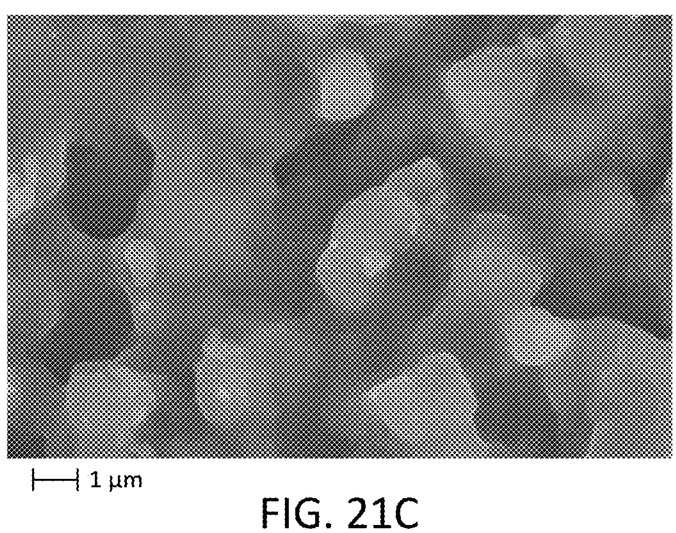

FIGS. 21A-21C show the effects of ultrasonic water-washing and annealing. FIG. 21A shows "raw" polysilicon granules. FIG. 21B shows water-washed polysilicon granules. Water spray washing was performed for 26 minutes. FIG. 21C shows annealed polysilicon granules. Annealing was performed at 100° C. for 8 hours. As shown in FIGS.

20B and 20C, both water washing and annealing provide more uniform, smooth surfaces than the raw granules. However, annealing provides a greater improvement than water washing.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A tumbling device for separating granular polysilicon and polysilicon powder, the tumbling device comprising:
- a tumbler drum comprising
  - a first end wall,
  - a second end wall,
  - a side wall that extends between the end walls and together with the end walls defines a chamber, the side wall configured to produce a primary transverse particle flow and a secondary transverse particle flow in the chamber by rotation of the tumbler drum,
  - a port extending through the side wall, the port being configured to provide access to the chamber for introducing the polysilicon material into the chamber and for removing the tumbled polysilicon material from the chamber, and
  - the side wall, the first end wall, the second end wall, or a combination thereof defining a gas inlet and an outlet, with the gas inlet and the outlet being at spaced apart locations;
- a source of sweep gas fluidly connected to the gas inlet;
- a dust collection assembly fluidly connected to the outlet; and
- a source of motive power operable to rotate the tumbler drum about an axis of rotation that extends longitudinally through the chamber.

2. The tumbling device of claim 1, wherein the gas inlet extends through the first end wall and the outlet extends through the second end wall, the tumbling device further comprising:
- an exhaust duct positioned between the dust collection assembly and the outlet, the exhaust duct being in fluid communication with the dust collection assembly and the outlet; and
- one or more helical vanes located within the exhaust duct.

3. The tumbling device of claim 2, wherein an outer surface of the helical vane comprises polyurethane.

4. The tumbling device of claim 1, wherein the side wall has a generally cylindrical interior surface, and the tumbler drum further comprises one or more lifting vanes attached to the side wall, spaced apart from one another and extending longitudinally along the interior surface of the side wall.

5. The tumbling device of claim 4, wherein the one or more lifting vanes are from one to forty lifting vanes.

6. The tumbling device of claim 4, wherein each lifting vane independently has a height from 0.01× to 0.3× of an inner diameter of the chamber, a leading edge with respect to the direction of rotation about the axis of rotation, and a leading edge pitch angle θ ranging from 15 to 90 degrees relative to a plane B parallel to an upper surface of the lifting vane and tangential to the interior surface of the side wall.

7. The tumbling device of claim 4, wherein each lifting vane comprises quartz, silicon carbide, silicon nitride, silicon, or a combination thereof, or has an outer surface that comprises polyurethane.

8. The tumbling device of claim 4, further comprising an intermediate support positioned between adjacent lifting vanes, wherein the intermediate support extends longitudinally along the interior surface of the side wall.

9. The tumbling device of claim 8, wherein the intermediate support has an outer surface that comprises polyurethane.

10. The tumbling device of claim 1, wherein the side wall, the first end wall, the second end wall, or a combination thereof comprises quartz, silicon carbide, silicon nitride, or silicon, or has an interior surface that comprises polyurethane.

11. A method for separating polysilicon powder from a mixture of granular polysilicon and polysilicon powder, comprising:
- introducing a polysilicon material that is a mixture of granular polysilicon and polysilicon powder into a tumbling device according to claim 1;
- rotating the tumbler drum of the tumbling device about the axis of rotation at a first rotational speed for a first period of time, the first rotational speed being 55-75% of the critical speed of the tumbler drum, the critical speed being the rotational speed at which centrifugal forces within the tumbler drum equal or exceed gravitational forces;
- subsequently rotating the tumbling device about the axis of rotation at a second rotational speed for a second period of time, the second rotational speed being 65-90% of the critical speed, wherein the first period of time and the second period of time combined are at least one hour;
- flowing sweep gas from the gas source through the chamber of the tumbler drum from the gas inlet to the outlet while the tumbling device is rotating, thereby entraining separated polysilicon powder in the sweep gas;
- passing sweep gas and entrained polysilicon powder through the outlet, whereby at least a portion of the polysilicon powder is separated from the granular polysilicon; and
- removing tumbled polysilicon material from the tumbling device, wherein the tumbled polysilicon material comprises a reduced percentage by weight of polysilicon powder than the introduced polysilicon material.

12. The method of claim 11, further comprising collecting the entrained separated polysilicon powder at a location external to the tumbling device.

13. The method of claim 11, further comprising:
- annealing the polysilicon material before introducing the polysilicon material into the tumbling device; or
- annealing the tumbled polysilicon material after removing the tumbled polysilicon material from the tumbling device.

14. The method of claim 11, wherein the first rotational speed is 55-65% of the critical speed of the tumbler drum, the critical speed being the rotational speed at which centrifugal forces within the tumbler drum equal or exceed gravitational forces, and the second rotational speed is 70-85% of the critical speed.

15. The method of claim 11, further comprising:
- subsequently flowing the tumbled polysilicon material through a zigzag classifier to remove additional polysilicon powder from the tumbled polysilicon material, wherein the zigzag classifier comprises
  - a baffle tube having a zigzag configuration, the tube having
    - an upper opening, a lower opening for discharging polysilicon material, and a port positioned between the upper opening and lower opening, the port being configured to receive the tumbled polysilicon material and deliver the tumbled polysilicon material into the baffle tube;

providing an upward flow of gas through the baffle tube, thereby entraining and removing at least a portion of the polysilicon powder from the tumbled polysilicon material as the tumbled polysilicon material traverses the baffle tube from the intermediate port to the lower opening; and collecting discharged polysilicon material from the lower opening, wherein the discharged polysilicon material comprises a reduced percentage by weight of polysilicon powder than the tumbled polysilicon material.

16. The method of claim 11, further comprising forming the introduced polysilicon material by:

flowing an initial mixture of granular polysilicon and polysilicon powder through a zigzag classifier, thereby removing a portion of the polysilicon powder from the initial mixture to form the mixture of granular polysilicon and polysilicon powder, wherein the zigzag classifier comprises a baffle tube having a zigzag configuration, the tube having, an upper opening, a lower opening for discharging polysilicon material, and a port positioned between the upper opening and lower opening, the port being configured to receive the initial mixture and deliver the initial mixture into the baffle tube;

providing an upward flow of gas through the baffle tube, thereby entraining and removing at least a portion of the polysilicon powder from the initial mixture as the initial mixture traverses the baffle tube from the intermediate port to the lower opening; and collecting polysilicon material that is discharged from the lower opening, wherein the collected polysilicon material comprises a reduced percentage by weight of polysilicon powder than the initial mixture.

17. The method of claim 11, wherein the side wall of the tumbler drum has a generally cylindrical interior surface, and the tumbler drum further comprises one or more lifting vanes attached to the side wall, spaced apart from one another and extending longitudinally along the interior surface of the side wall.

18. The method of claim 11, further comprising:

introducing the polysilicon material into the tumbling device via the port extending through the side wall; and closing the port before rotating the tumbler drum.

* * * * *